United States Patent
Butler et al.

(10) Patent No.: US 7,170,076 B2
(45) Date of Patent: Jan. 30, 2007

(54) TOOLS WITH ORIENTATION DETECTION

(75) Inventors: Andrew G. Butler, Palo Alto, CA (US); Christopher A. Tacklind, Palo Alto, CA (US); Lance Reisman, San Mateo, CA (US); Aragon Burlingham, San Francisco, CA (US); Daniel T. Adams, Menlo Park, CA (US); Eugene F. Duval, Menlo Park, CA (US); William A. Scott, Palo Alto, CA (US); Rick Feffer, Aptos, CA (US); Jonathan Carver, Santa Cruz, CA (US)

(73) Assignee: Robotoolz Limited, Kowloon (HK)

( * ) Notice: Subject to any disclaimer, the term of this patent is extended or adjusted under 35 U.S.C. 154(b) by 411 days.

(21) Appl. No.: 10/081,865

(22) Filed: Feb. 22, 2002

(65) Prior Publication Data

US 2003/0000355 A1    Jan. 2, 2003

Related U.S. Application Data

(60) Provisional application No. 60/271,844, filed on Feb. 27, 2001, provisional application No. 60/270,733, filed on Feb. 22, 2001.

(51) Int. Cl.
*B23Q 15/22* (2006.01)
*B23Q 15/14* (2006.01)

(52) U.S. Cl. .............. 250/559.29; 250/559.3; 356/400; 356/622; 408/13; 408/16; 83/72; 83/74

(58) Field of Classification Search .......... 250/559.29, 250/559.3, 559.33, 559.38; 356/138, 399, 356/400, 614, 620, 622, 625, 626, 624; 700/56–59, 700/90, 275; 33/286, 638; 408/13, 16; 83/72, 83/74, 75
See application file for complete search history.

(56) References Cited

U.S. PATENT DOCUMENTS

| | | | |
|---|---|---|---|
| 5,461,790 A | | 10/1995 | Olstowski |
| 5,522,683 A | * | 6/1996 | Kakimoto et al. ............ 408/13 |
| 5,675,899 A | | 10/1997 | Webb |
| 5,741,096 A | * | 4/1998 | Olds .......................... 408/1 R |
| 5,947,805 A | | 9/1999 | Van Osenbruggen |
| 6,062,778 A | * | 5/2000 | Szuba et al. ................ 408/156 |
| 6,072,583 A | * | 6/2000 | Kellner ....................... 356/614 |
| 6,084,679 A | * | 7/2000 | Steffan et al. .............. 356/401 |

(Continued)

*Primary Examiner*—Stephone B. Allen
*Assistant Examiner*—Davienne Monbleau
(74) *Attorney, Agent, or Firm*—Vierra Magen Marcus & DeNiro LLP

(57) ABSTRACT

A tool operates with a guide system to identify the orientation of a tool on a work piece. In one implementation, the tool identifies its orientation with respect to a guide signal supplied by the guide system. In an alternate embodiment, the tool determines its absolute orientation, such as a (x, y) coordinate. The tool includes an action component adapted to alter the work piece, such as a cutting head in a router. A guide detector in the tool detects a position of a guide signal from the guide system. A location detector in the tool receives the position data and employs it to determine the tool's orientation. Based on the detected orientation, the tool decides whether any tool adjustments are necessary. Examples of tool adjustments include the following: adjusting the position of the action component, enabling or disabling the action component, and providing operating indicators to direct a tool operator's use of the tool.

70 Claims, 20 Drawing Sheets

U.S. PATENT DOCUMENTS

| | | |
|---|---|---|
| 6,301,763 B1 | 10/2001 | Pryor |
| 6,301,997 B1 | 10/2001 | Welte |
| 6,375,395 B1 | 4/2002 | Heintzeman |
| 6,459,483 B1 | 10/2002 | Shafer et al. |
| 6,474,378 B1 | 11/2002 | Ryan et al. |
| 2004/0265079 A1* | 12/2004 | Dils et al. .................... 408/16 |

* cited by examiner

TOOLS WITH ORIENTATION DETECTION

CLAIM OF PRIORITY

This application claims the benefit of U.S. Provisional Application No. 60/270,733, "Manually Guided, Self-Correcting, Power Tools," filed on Feb. 22, 2001, and U.S. Provisional Application No. 60/271,844, "Manually Guided, Self-Correcting, Power Tools," filed on Feb. 27, 2001, both of which are incorporated herein by reference.

CROSS-REFERENCE TO RELATED APPLICATION

This Application is related to the following Application: "Detecting Tool Orientation, Alignment, Depth, and Leveling," by Andrew Butler, Christopher A. Tacklind, Lance Reisman, Aragon Burlingham, Dan Adams, Gene Duval, William Scott, Rick Feffer, and Jon Carver, Ser. No. 10/081,866, filed the same day as the present application, and incorporated herein by reference.

BACKGROUND OF THE INVENTION

1. Field of the Invention

The present invention is directed to a tool system with orientation detection.

2. Description of the Related Art

Power tool operators often need to perform precise operations with their tools. Examples of such operations include the following: cutting a surface along a straight line, routing a detailed pattern into a surface, and driving nails into a surface in conformance with a predefined pattern or spacing.

Current power tools don't provide efficient mechanisms for aiding operational accuracy. For example, a circular saw operator can restrict the saw's blade to a desired line by mounting a heavy set of guide rails to a cutting surface. This type of guidance mechanism is cumbersome to transport and limited in the number of applications it supports.

In many instances, tool operators must rely on their own hand-eye coordination to make orientation adjustments during a tool's operation. No mechanism is provided to dynamically orient or assist in the orientation of the tool's operational action component, such as a saw blade, nail gun firing mechanism, or router cutting head.

Accordingly, there is a need for a power tool that dynamically adjusts or assists users in adjusting tool orientation.

SUMMARY OF THE INVENTION

The present invention, roughly described, pertains to a tool that detects its orientation on a work piece. In some implementations, the tool self adjusts or assists users in making tool adjustments, based on the detected orientation. Nail guns, jigsaws, circular saws, and routers serve as a partial list of tools in which this functionality is useful.

In one embodiment, a tool is employed along with a guide system that supplies a guide signal to identify a line on a work piece, such as a wood surface. The tool detects the guide signal and determines the tool's orientation with respect to the line on the work piece. In a further embodiment, the guide system supplies the tool with guide signals that enable the tool to determine its absolute position on the work piece. For example, the tool can employ the guide signals to determine the tool's (x, y) coordinate orientation on a surface.

One example of a guide system is a laser projector that supplies one or multiple laser beams. The tool includes an array of photo diode detectors to detect the positions of the laser beams relative to the tool. The tool determines its orientation, based on the detected laser beam positions. Alternate guide systems include guide wires, track balls, and range finders.

The tool employs its detected orientation to enhance tool performance. In one implementation, the tool adjusts its orientation. For example, a jigsaw rotates its blade after determining that the current orientation will not yield the desired cut. In another implementation, the tool provides a user with steering directions, based on the determined orientation. In one instance, a nail gun employs a set of directional indicators to show a user the necessary movement of the gun to reach a desired target.

In further embodiments, tools make alternate adjustments based on the determined orientation. A router adjusts the vertical displacement of its cutting head, based on the router's orientation on a work piece. A nail gun enables and disables its nail firing mechanism, based on the gun's orientation on a work piece. Those skilled in the art will recognize that the application of the present invention to nail guns, saws, and routers are only exemplars of the invention's utility. Embodiments of the present invention can be implemented in a variety of tools.

The present invention can be accomplished using hardware, software, or a combination of both hardware and software. The software used for the present invention is stored on one or more processor readable storage media including hard disk drives, CD-ROMs, DVDs, optical disks, floppy disks, tape drives, RAM, ROM, memory sticks or other suitable storage devices. In alternative embodiments, some or all of the software can be replaced by dedicated hardware including custom integrated circuits, gate arrays, FPGAs, PLDs, and special purpose computers.

These and other objects and advantages of the present invention will appear more clearly from the following description.

DETAILED DESCRIPTION

A. Tool Architecture and Operation

Figure 1:
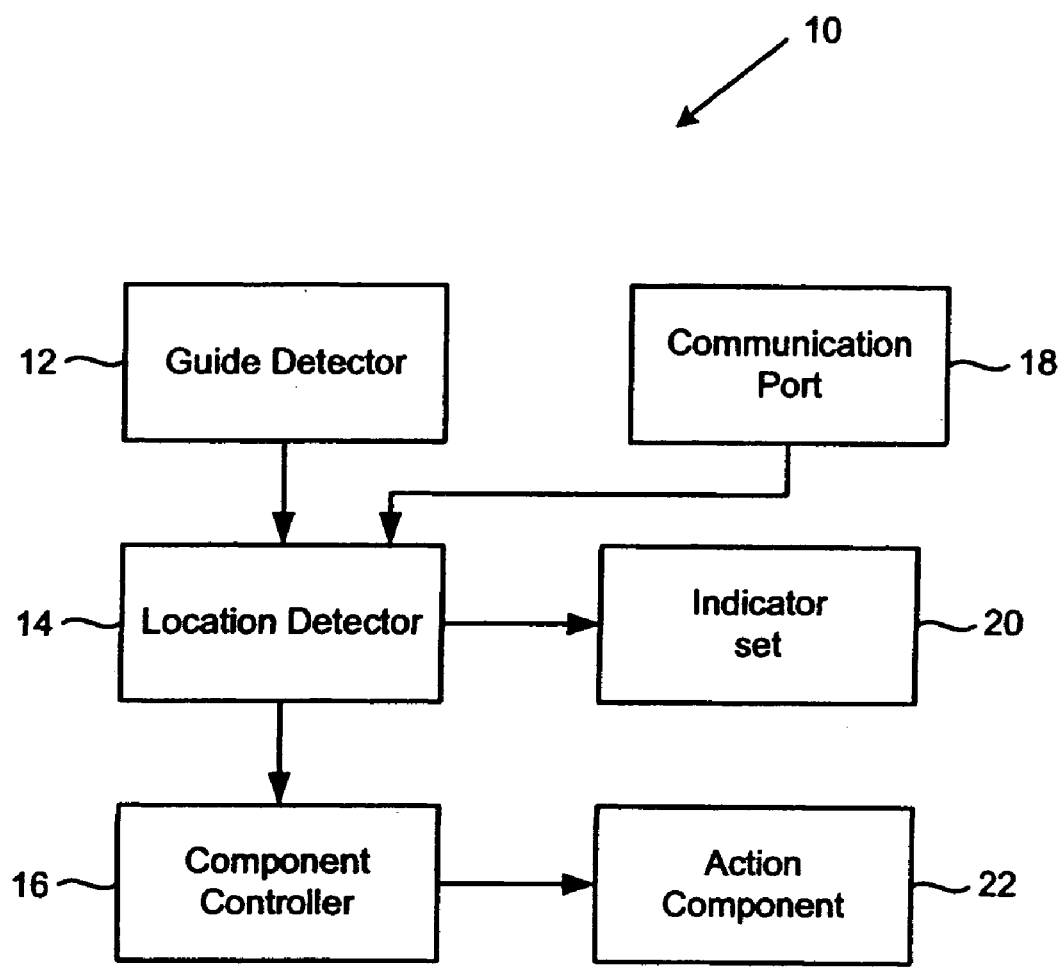
FIG. 1 depicts a block diagram of a tool in accordance with the present invention.

FIG. 1 shows a block diagram of tool 10, which represents one embodiment of the present invention. Nail guns, jigsaws, circular saws, and routers are non-exhaustive examples of the types of tools that tool 10 can be. The implementation of nail guns, jigsaws, circular saws, and routers in accordance with the present invention are described later in greater detail with reference to FIGS. 8–14.

Tool 10 includes action component 22, which operates on a work piece. Examples of action component 22 include saw blades, router cutting heads, and nail gun firing mechanisms. Component controller 16 is coupled to action component 22 to control the operation of action component 22—directing the operation of action component 22 in response to an orientation of tool 10. In alternate implementations, tool 10 does not include component controller 16, since tool 10 does not adjust the orientation of action component 22.

Guide detector 12 receives guides from a guide system (not shown) and ascertains the position of the guides relative to tool 10. In one embodiment, guide detector 12 is a pair of photo diode detectors used to detect the position of laser beams from a laser guidance system. Guide detector 12 is coupled to location detector 14 to provide position data reflecting the guide positions. Location detector 14 determines an orientation of tool 10 relative to a work piece on which action component 22 will operate. Location detector 14 is coupled to component controller 16 to supply information identifying the tool orientation. Controller 16 then uses this orientation information to make adjustments to action component 22, such as changing the orientation or state of component 22. In some embodiments, the orientation information corresponds to tool adjustments that component controller 16 must make.

Location controller 14 is also coupled to communication port 18 and indicator set 20. Communication port 18 enables location detector 14 to share orientation information with external devices, such as the guide system. Indicator set 20 provides directional signals to tool operators to assist in steering or aiming tool 10. Indicator set 20 is coupled to location detector 14 to receive tool orientation information that controls which indicators are asserted. Alternate implementations of tool 10 include either indicator set 20 or action component 22, but not both. Some versions of tool 10 do not include communication port 18.

Applications of the block diagram architecture shown in FIG. 1 to specific types of tools, including nail guns, power saws, and routers are described below with reference to FIGS. 8–14.

Figure 2:
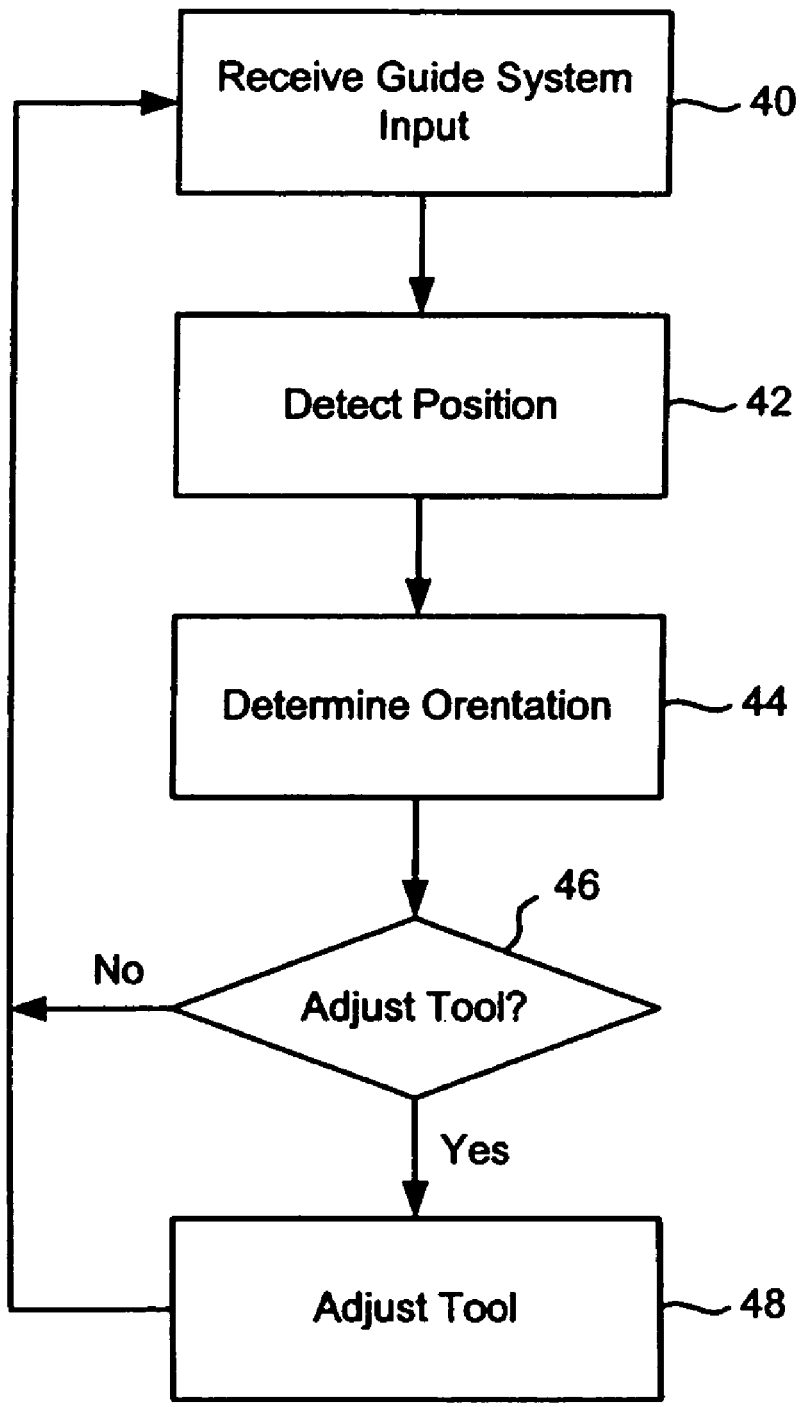
FIG. 2 illustrates a series of operations performed by the tool shown in FIG. 1.

FIG. 2 shows a sequence of operations performed by one version of tool 10. Guide detector 12 receives one or more guide inputs from one or more guide systems, such as a laser beam from a laser system (step 40). Guide detector 12 detects the positions of the guides relative to tool 10 and forwards data identifying the position to location detector 14 (step 42). Location detector 14 employs the position data to determine the orientation of tool 10 with respect to a work piece, such as a piece of wood to be routed by tool 10 (step 44). In order to facilitate the orientation determination by location detector 14, the one or more guide systems have a predefined physical relationship to the work piece. Examples of different guide systems are provided below.

By detecting the orientation of tool 10, location detector 14 inherently determines the orientation of action component 22. In this application, the operation of determining the orientation of tool 10 is considered interchangeable with the operation of determining the orientation of action component 22. Action component 22 has a known physical displacement from guide detector 12. When detecting the orientation of tool 10 in one embodiment, location detector 14 determines the orientation of guide detector 12, based on the position data, and applies the known physical displacement to determine the orientation of action component 22.

Location detector 14 determines whether any adjustment needs to be made to tool 10, based on the identified orientation (step 46). Examples of situations where tool adjustments are needed include the following: 1) a jigsaw blade's orientation being out of alignment with a desired cutting line on a work piece, 2) a nail gun's orientation corresponding to a position on a work piece where the gun's firing mechanism should not be enabled, and 3) a router cutting head's orientation corresponding to a location on a work piece where the head's vertical displacement needs to be adjusted.

If an adjustment is needed, the state of tool 10 is adjusted (step 48). Otherwise, no adjustment is made. In either instance, tool 10 continually repeats the process shown in FIG. 2. On example of an adjustment made by tool 10 (step 48) is changing the orientation of action component 48. Component controller 16 recognizes that the orientation of action component 22 needs to be adjusted, based on orientation information supplied by location detector 14. Component controller 16 continues to adjust the orientation of action component 22, until the orientation information from location detector 14 no longer indicates any adjustment is necessary. For example, component controller 16 continues to adjust the orientation of a jigsaw's blade until location detector 16 indicates that the blade is in line with a desired cutting line.

Another type of adjustment made by tool 10 (step 48) is altering the state of action component 22, based on orientation information supplied by location detector 14. In this embodiment, location detector 14 recognizes the orientation of tool 10 as corresponding to a desired state of action component 22. Location detector 14 then supplies orientation information to component controller 16—causing controller 16 to place component 22 in the desired state. For example, component controller 16 enables or disables the firing mechanism of a nail gun, based on the firing mechanism's orientation.

Tool adjustments (step 48) also include asserting and deasserting indicators that direct a tool user's operation of tool 10. Indicator set 20 in tool 10 responds to the tool orientation provided by location detector 14 to provide the tool's user with proper signaling. For example, in a router indicator set 20 provides directional signals to the tool user—indicating the direction the user should steer the router, based on the router's current orientation on a work piece. A light emitting diode is one type of indicator that can be employed in tool 10.

B. Employing Different Guide Systems

Figure 3:
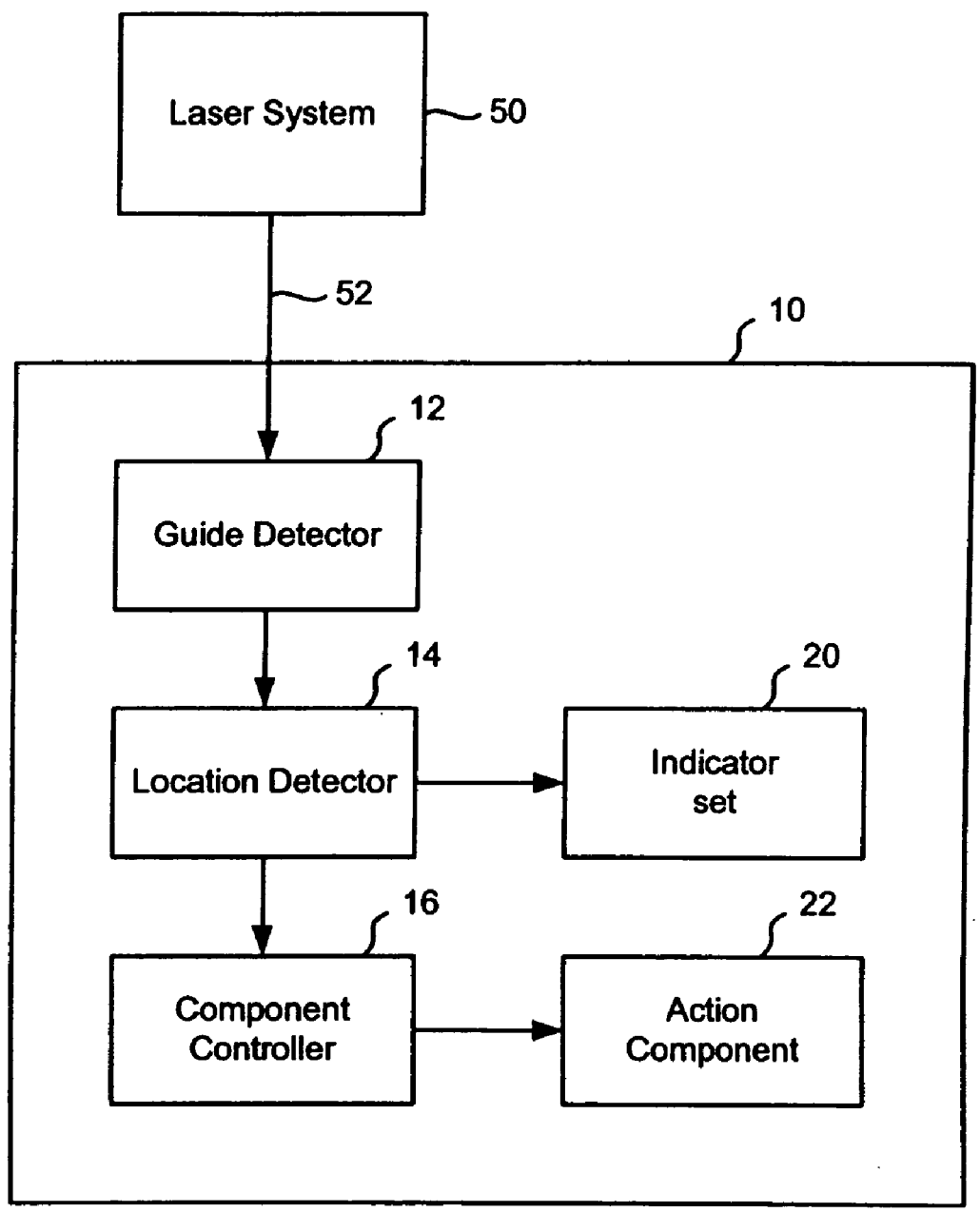
FIG. 3 shows a block diagram of a tool operating with a laser system in accordance with the present invention.

FIG. 3 shows tool 10 in use with a single laser system 50 that provides a single laser beam 52 as a guide. Examples of a laser projection systems that can be employed as laser system 50 are described in U.S. Pat. No. 5,680,208, issued Oct. 21, 1997; Ser. No. 08/953,935, filed Oct. 20, 1997; U.S. Pat. No. 5,903,345, issued May 11, 1999; Ser. No. 09/247,750, filed Feb. 9, 1999; Ser. No. 09/571,482, filed May 16, 2000, and Ser. No. 09/928,244, filed Aug. 10, 2001 all of which are included herein by reference.

Laser system 50 can be self-leveling or non-self-leveling. The central axis of laser beam 52 identifies a path on a work piece, such as a cutting line to be followed by a jigsaw's blade. Guide detector 12 receives laser beam 52 and identifies the position of laser beam 52 relative to tool 10. In one implementation, guide detector 12 includes an array of photo diode detectors. The photo diode detectors are arranged so that each photo diode provides the same signal when tool 10 is oriented with action component 22 in line with the work piece path. When tool 10 is not oriented in this fashion, the photo diode detectors supply unequal signals.

Location detector 14 receives the output of the photo diode detectors. Location detector 14 determines the orientation of tool 10 with respect to the work piece path, based on the position data supplied as output signals from the photo diodes. If all the signals are equal, location detector 14 determines that tool 10 is oriented so that action component 22 is in line with the desired path on the work piece. If the photo diode signals are not all equal, location detector 14 identifies tool 10 as being offset from the work piece path in a direction that corresponds to the strongest photo diode signals. For example, if guide detector 12 has two photo diode to detect beam 52, the tool is offset to the right of the work piece path if the right most photo diode detector provides a stronger signal than the other detector.

Those of ordinary skill in the art will recognize that numerous types and arrangements of laser beam detectors can be employed in guide detector 12 to achieve the above-described operation of tool 10. As shown in FIG. 3, tool 10 does not include communications port 18. In alternate embodiments of a single laser application, communications port 18 is included in tool 10.

Figure 4:
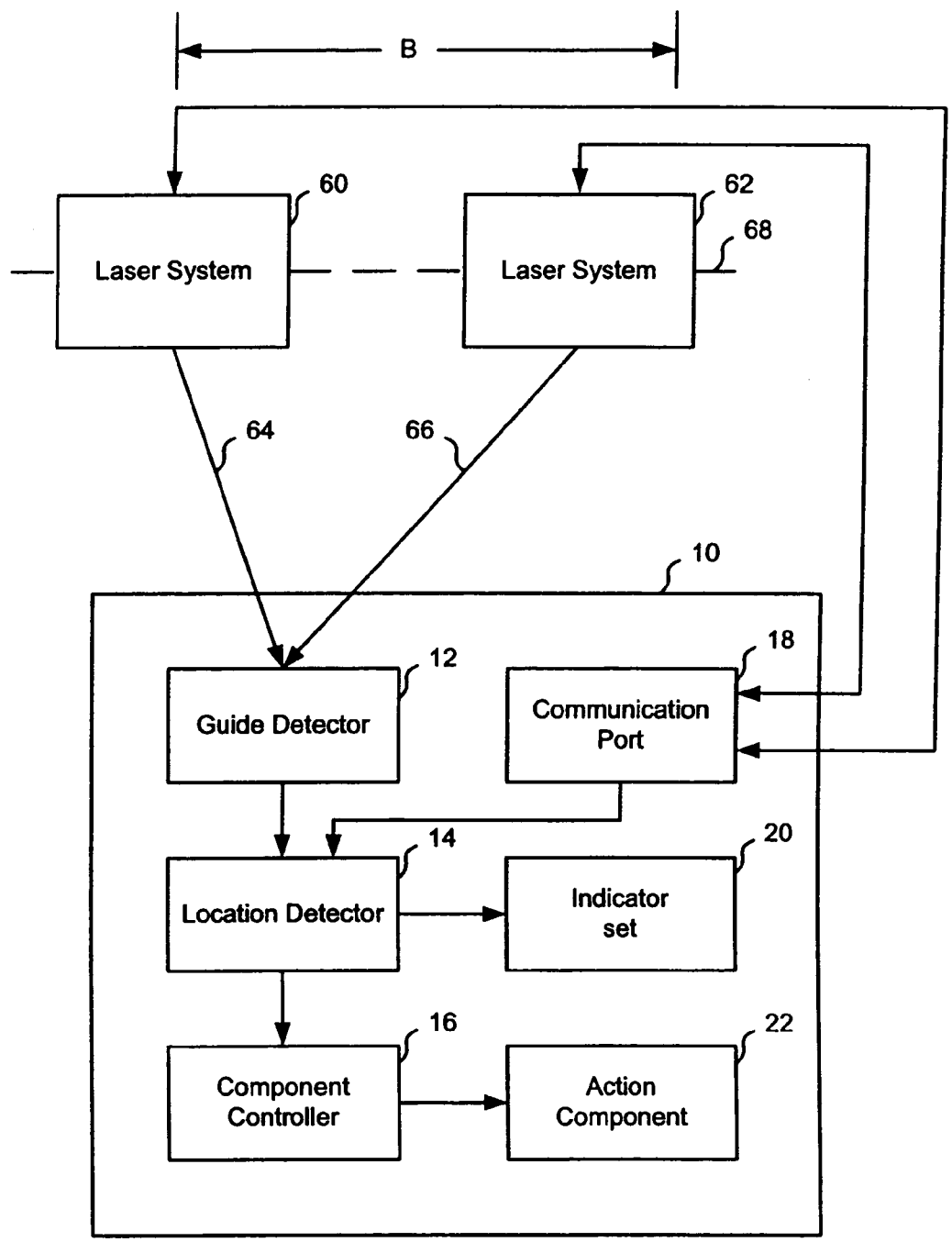
FIG. 4 depicts a block diagram of a tool operating with a pair of laser systems in accordance with the present invention.

FIG. 4 shows tool 10 in use with laser systems 60 and 62, which provide laser beams 64 and 66, respectively. Tool 10 employs beams 64 and 62 to identify the orientation of tool 10 on a work piece in terms of an absolute position, such as an (x,y) coordinate. Laser systems 60 and 62 are the same as laser system 50 in FIG. 3. In one embodiment, Laser systems 60 and 62 are rotating laser systems. Laser systems 60 and 62 are positioned so that laser beams 64 and 66 each have a predefined point of origin within a coordinate system covering the work piece. For example, a wooden surface to be routed can be described in terms of a two dimensional orthogonal (x,y) coordinate system that includes the points of origin for laser beams 64 and 68.

Guide detector 12 includes an array of photo diode detectors, as described above with reference to FIG. 3. Guide detector 12 detects when tool 10 is oriented in a position where laser beams 64 and 66 each intercept the same predetermined location in the array, such as the array's center. This indication is provided as position data in the form of photo diode signal intensity, as described above for guide detector 12 in FIG. 3. Guide detector 12 also determines the time required for laser beams 64 and 66 to each rotate between the predefined location on the photo diode detector array and axis 68—the axis line passing through the origin points of laser beams 64 and 66. In one version of this embodiment, axis line 68 is parallel to one axis in a two dimensional coordinate system encompassing the work piece and perpendicular to the other axis in the two dimensional coordinate system. Guide detector 12 passes the time measurements to location detector 14 to serve as position data—identifying the positions of laser beams 64 and 66 relative to tool 10. Location detector 14 uses the time measurements to determine the orientation of tool 10. Location detector 14 determines a (x, y) coordinate for guide detector 12. This coordinate corresponds to a (x, y) coordinate for action component 22, which has a known displacement from guide detector 12.

The (x, y) coordinate of guide detector 12 resides at the intersection of laser beams 64 and 66. Location detector 14 employs the laser rotation times to determine x and y displacements for the lines formed by laser beams 64 and 66. The x and y displacements are then employed by location detector 14 to calculate the x; y offset of guide detector 12 from the known x, y coordinates of the origins of laser beams 64 and 66.

In order to determine the x, y displacements from laser beams 64 and 66, location detector 14 employs the following relationships in one embodiment:

From the time detections made by guide detector 12, location detector 14 determines the angles in the triangle formed by laser beam 64, laser beam 66, and axis line 68 using the following equations:

$$\theta_{60} = \frac{360°(t_{64})}{t_{60}}$$

$$\theta_{62} = \frac{360°(t_{66})}{t_{62}}$$

wherein:

$\theta_{60}$ is the angle between axis line 68 and laser beam 64 within the triangle formed by laser beam 64, laser beam 62, and axis line 68.

$\theta_{62}$ is the angle between axis line 68 and laser beam 66 within the triangle formed by laser beam 64, laser beam 62, and axis line 68.

$t_{60}$ is the time required for laser beam 64 to make a complete revolution.

$t_{62}$ is the time required for laser beam 62 to make a complete revolution.

$t_{64}$ is the time required for laser beam 64 to traverse angle $\theta_{60}$.

$t_{66}$ is the time required for laser beam 66 to traverse angle $\theta_{62}$.

From the law of cosines the lengths of laser beams 64 and 66 can be derived using the following equations:

$$L_{64}^2 = B^2 + L_{66}^2 - 2(B)(L_{66})\cos\theta_{62}$$

$$L_{66}^2 = B^2 + L_{64}^2 - 2(B)(L_{64})\cos\theta_{60}$$

wherein:

$L_{64}$ is the length of laser beam 64.

$L_{66}$ is the length of laser beam 66.

B is a known distance between the points of origin for laser beam 64 and laser beam 66.

From trigonometry, the x and y displacements of laser beams 64 and 66 from their respective points of origin can be found using the following equations, where axis 68 is parallel to the x axis:

$$x_{64} = L_{64} \sin(90° - \theta_{60})$$

$$y_{64} = L_{64} \cos(90° - \theta_{60})$$

$$x_{66} = L_{66} \sin(90° - \theta_{62})$$

$$y_{66} = L_{66} \cos(90° - \theta_{62})$$

wherein:

$x_{64}$ is the x axis displacement from the origin of laser beam 64 to the point where laser beam 64 is incident on guide detector 12.

$y_{64}$ is the y axis displacement from the origin of laser beam 64 to the point where laser beam 64 is incident on guide detector 12.

$x_{66}$ is the x axis displacement from the origin of laser beam 66 to the point where laser beam 66 is incident on guide detector 12.

$y_{66}$ is the y axis displacement from the origin of laser beam 66 to the point where laser beam 66 is incident on guide detector 12.

In alternate embodiments, location detector 14 includes a look-up table that converts time measurements pairs for laser beams 64 and 66 into (x, y) coordinates.

In one implementation, tool 10 receives values for $t_{64}$, $t_{66}$, and B from laser systems 60 and 62 via communications port 18. Communication port 18 can communicate with laser systems 60 and 62 using many well-known communication media and protocols. Example media include radio frequency, infrared and cable signaling. In other implementations, values for $t_{60}$, $t_{62}$, and B are stored in tool 10—eliminating the need to use communication port 18.

In other versions of tool 10, different well-known methods are employed for ascertaining x, y displacements for laser beams 64 and 66.

Figure 5:
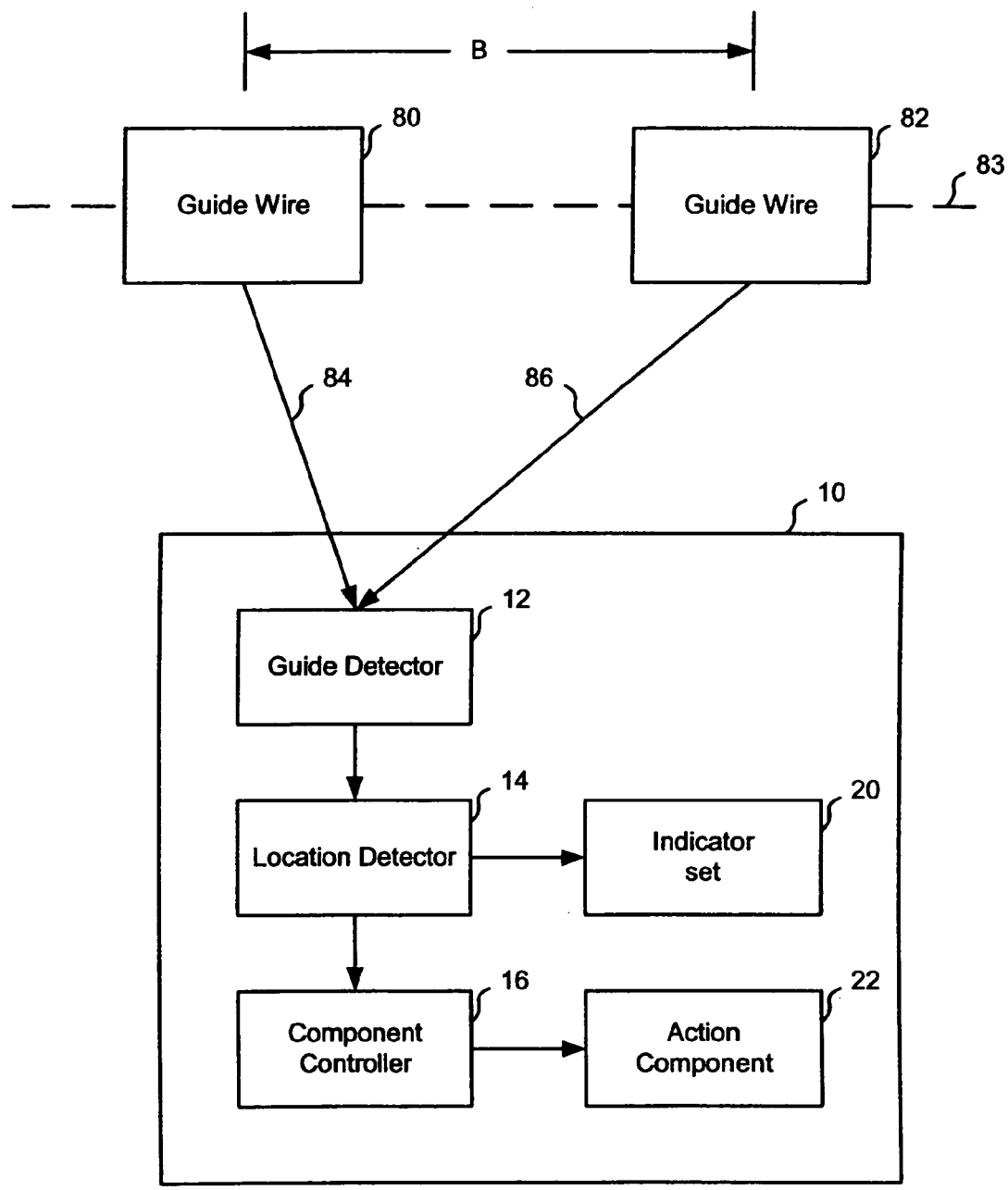
FIG. 5 shows a block diagram of a tool operating with a pair of guide wires in accordance with the present invention.

FIG. 5 illustrates tool 10 in use with guide wire systems 80 and 82 to determine the orientation of tool 10. In this embodiment, tool 10 obtains a (x, y) coordinate to serve as the orientation of tool 10. Guide wire system 80 anchors guide wire 84, and guide wire system 82 anchors guide wire 86. The anchors reside on axis line 83, which is the same as axis line 68 in FIG. 4. The distance B between the anchor points is known to location detector 14.

Wires 84 and 86 are each coupled to guide detector 12 with a two-spring tension wire real device in guide detector 12. Guide detector 12 has a device to measure the displacement distance of wires 84 and 86. In one implementation, the displacement measuring device is an encoder attached to the real device to detect the extension of wires 84 and 86.

Guide detector 12 supplies the wire lengths to location detector 14 as position data that identifies the position of tool 10 relative to guide wire systems 80 and 82. Location detector 14 determines the orientation of tool 10 using the wire lengths and the trigonometric principles described above with reference to FIG. 5. Using the law of cosines, the angles between (1) wire 84 and axis 83 and (2) wire 86 and axis 83 can be found. Once the angles are known, location detector 14 can solve for the x and y displacements of wires 84 and 86 to obtain a coordinate for tool 10.

Figure 6:
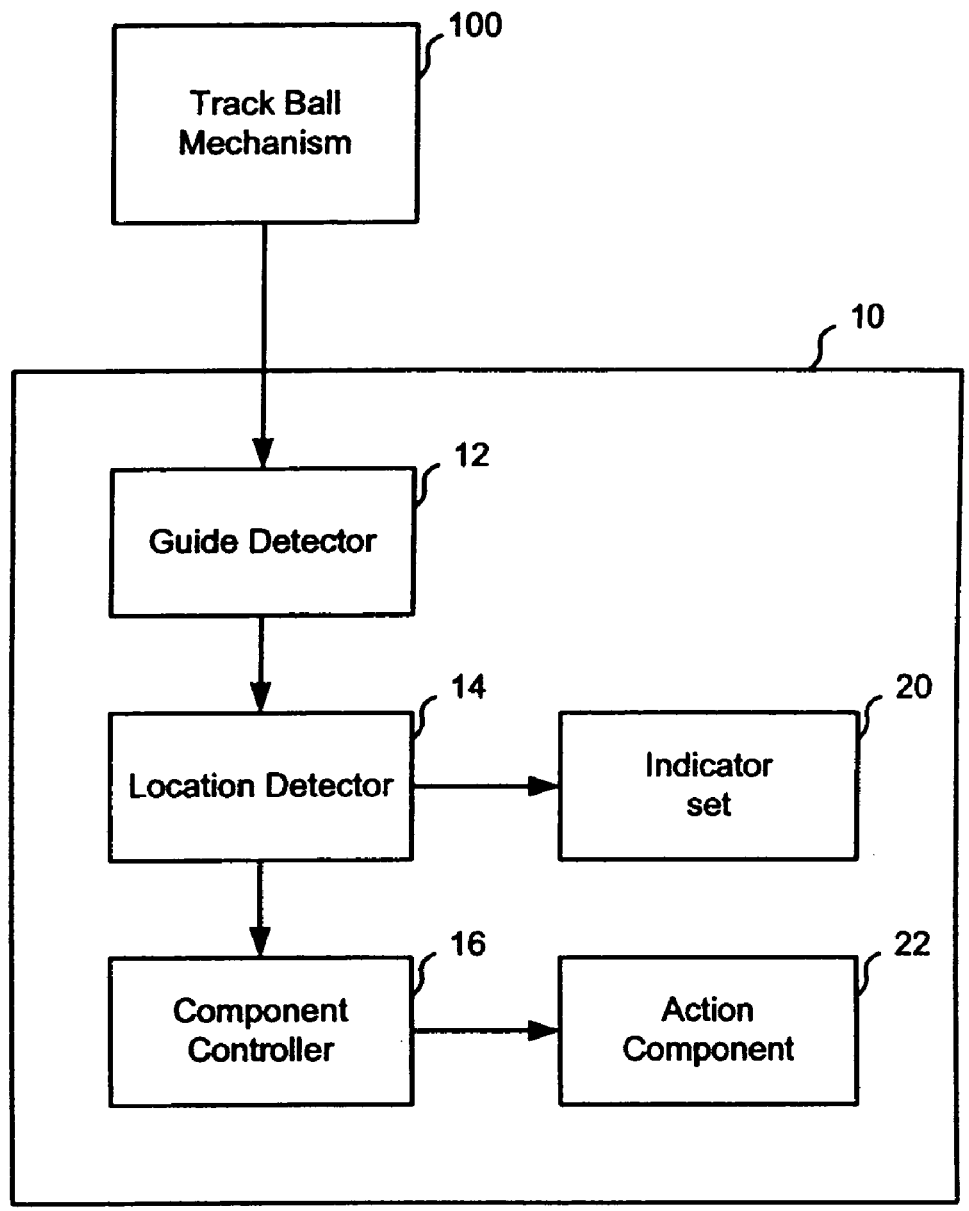
FIG. 6 illustrates a block diagram of a tool operating with a track ball mechanism in accordance with the present invention.

FIG. 6 depicts tool 10 in operation with track ball mechanism 100 serving as a guide system. In one embodiment, track ball mechanism 100 is a well known rolling sensor used in a computer mouse to determine movements. In alternate implementations, optical tracking systems like those used in an optical computer mouse can be employed.

Track ball mechanism 100 is attached to tool 10 and provides information identifying changes in the two dimensional (x, y) orientation of the track ball. Guide detector 12 receives this information and passes it to location detector 14 as position data identifying the position of track ball mechanism 100. Location detector 14 employs the two dimensional position data to determine a tool orientation. In one embodiment, location detector 14 applies the x, y changes to the tool's prior x, y coordinates.

Figure 7:
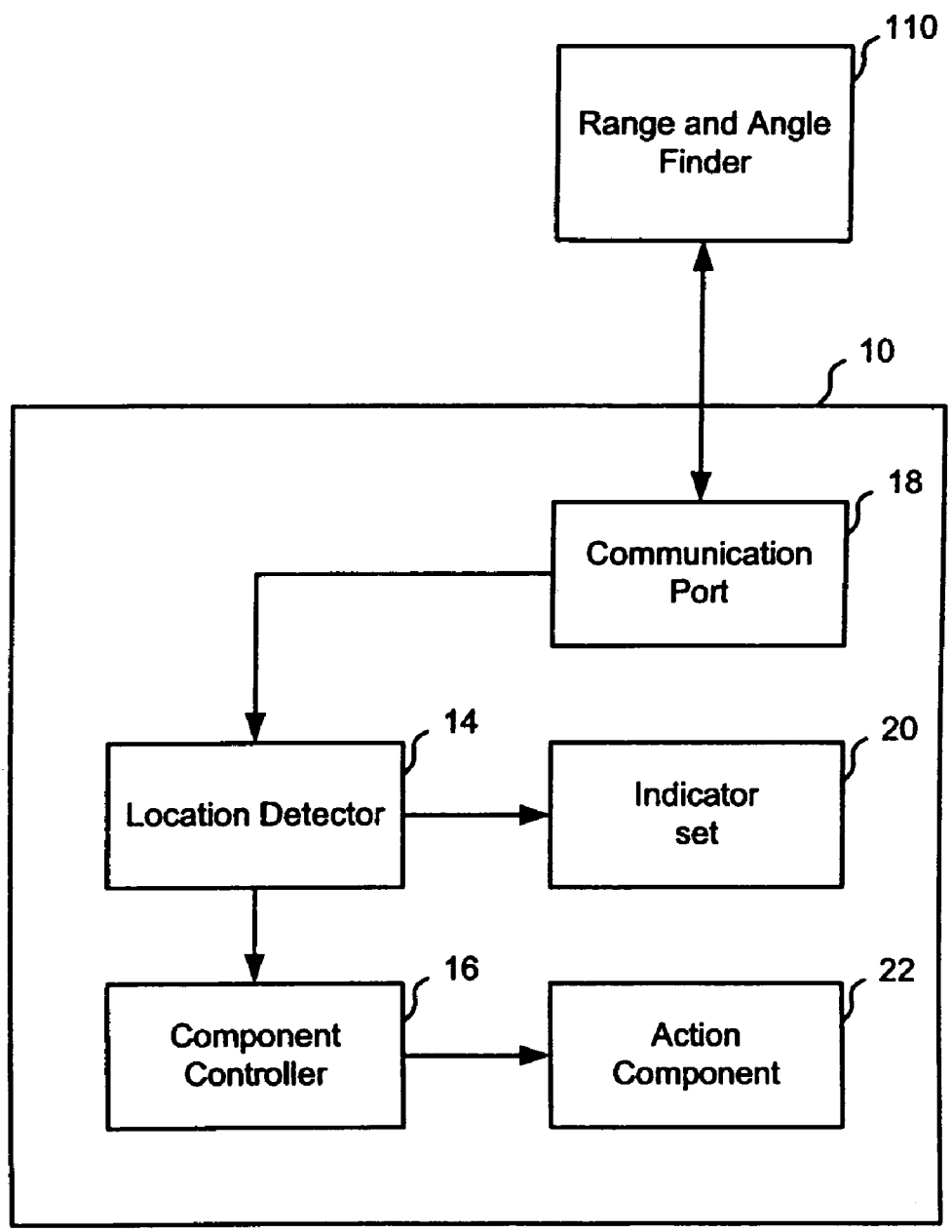
FIG. 7 depicts a block diagram of a tool operating with range finder in accordance with the present invention.

FIG. 7 illustrates tool 10 operating with range and angle finder 110 as a guide system. Range and angle finder 110 determines the displacement of tool 10 from finder 110 and communicates the displacement to communication port 18. Those skilled in the art will recognize that a standard range and angle finder can be employed, such as a range and angle finder employing laser, infra red, or radio frequency signaling. In one implementation, range and angle finder 110 has a rotating range and angle finding signal, while in other embodiments, the range and angle finder signal does not rotate.

Location detector 14 receives the displacement information from communications port 18 and determines the orientation of tool 10. In one implementation, range and angle finder 110 supplies the displacement information as a two-dimensional polar coordinate (θ, r). As shown in FIG. 7, guide detector 12 is not included in tool 10 in the range and angle finder embodiment, since range and angle finder 110 provides coordinates.

The above-described guide systems are not an exhaustive list of guide systems. Those skilled in the art will recognize that numerous alternative guide systems can be employed in embodiments of the present invention.

C. Example Embodiments

The following provides example embodiments of the above-described tool 10.

1. Nail Gun Embodiments

Figure 8:
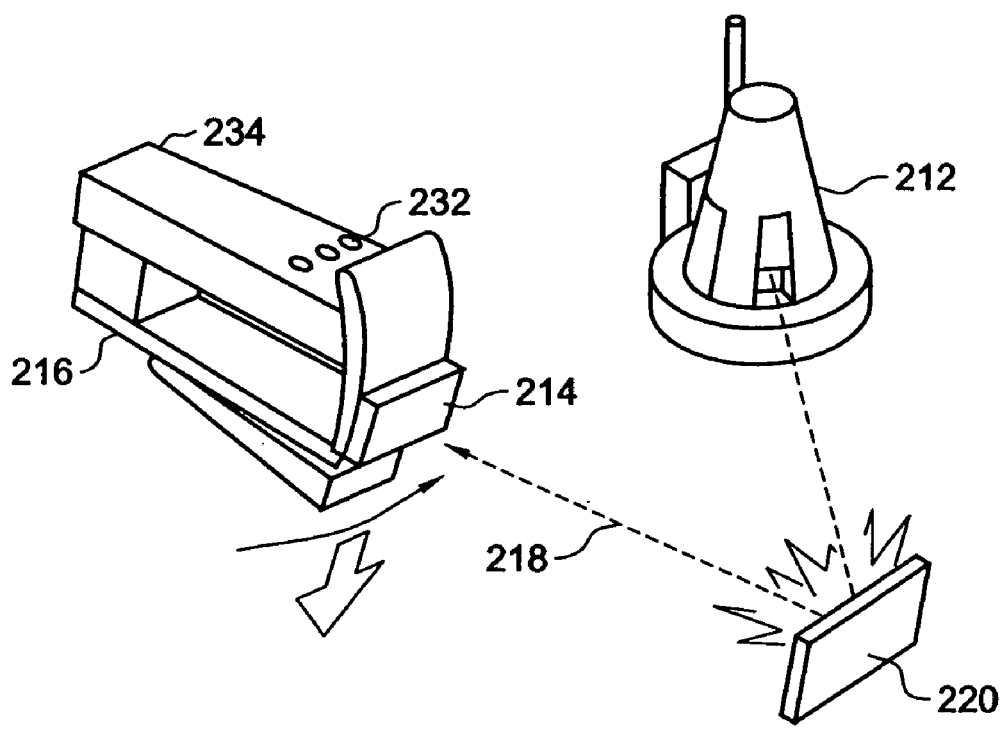
FIG. 8 depicts a nail gun operating with a laser system in accordance with the present invention.

FIG. 8 shows nail gun 216 in use with laser system 212 in accordance with the present invention. Nail gun 216 has the functionality and design described above for tool 10 with reference to FIG. 3. Laser system 212 operates as described above for laser system 50 in FIG. 3. Laser system 212 provides laser beam 218 as a guide signal to nail gun 216. In the embodiment shown in FIG. 8, beam 218 reflects off mirror 220, but in alternate implementations laser beam 218 is provided directly to nail gun 216.

Photo diode detector array 214 is mounted on the head of a nail gun 216 to operate as guide detector 12. When detector array 214 has a predetermined alignment with laser beam 218 and the nail gun's trigger is squeezed, nail gun 216 automatically fires. When detector array 214 is not properly aligned with laser beam 218, nail gun 216 will not fire. This arrangement allows for nail gun 216 to be fired along a line defined by laser beam 218. Nail gun 216 includes component controller 16 to set the firing state of the nail firing mechanism in gun 216 based on the gun's orientation.

In an alternate embodiment, nail gun 216 only fires nails when the gun is offset from laser beam 218—creating a staggered nail pattern that avoids splitting natural material such as a rafter or joist member. In order to further assist tool operators, nail gun 216 includes directional light emitting diodes ("LEDs") 232 on top of the gun to serve as indicator set 20. Nail gun 216 lights a center LED when the gun is directly in line with laser beam 218 and lights either a right or left LED to direct the user to one side of laser beam 218.

Figure 9:
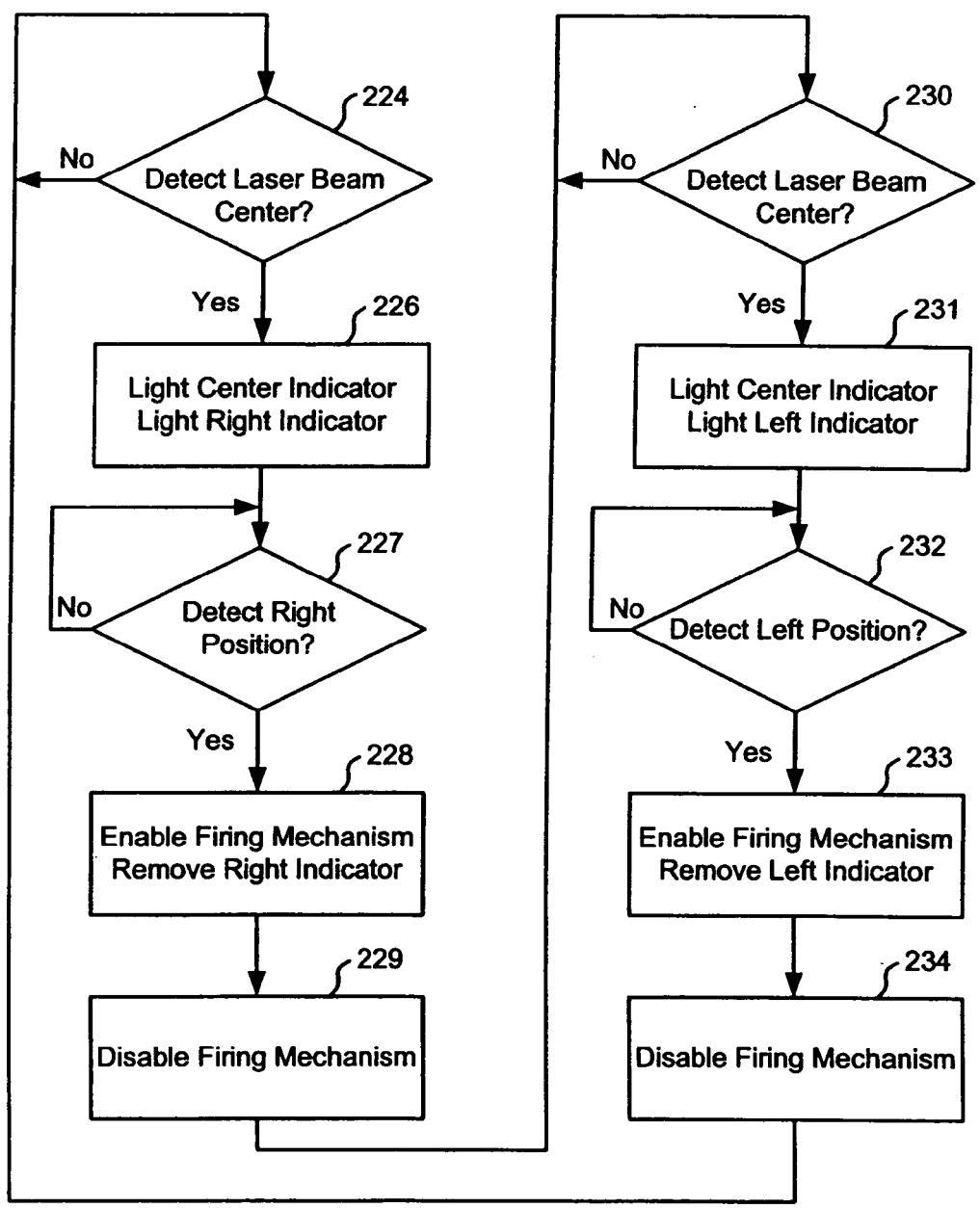
FIG. 9 shows a sequence of steps performed by the nail gun shown in FIG. 8.

FIG. 9 depicts a series of operation taken by nail gun 216 to create a staggered nail pattern. Photo diode array 214 combines with location detector 14 to determine whether nail gun 216 is oriented in line with the center of laser beam 218 (step 224). Once nail gun 216 is oriented on the center of laser beam 218, indicator set 20 lights a center LED and a right LED (step 226). The right LED shows the tool operator to steer gun 216 to the right.

Photo diode array 214 combines with location detector 14 to determine when nail gun 216 is oriented to the right of laser beam 218 in a position for firing (step 227). Once nail gun 216 is in a firing position, component controller 16 enables the gun's firing mechanism, and indicator set 20 deasserts the right LED (step 228). In operation, a user has the nail gun trigger pulled when the firing mechanism is enabled—resulting in a nail being driven into the work piece. After the nail is fired, component controller 16 disables the nail gun firing mechanism (step 229).

Photo diode array 214 once again combines with location detector 14 to determine whether nail gun 216 is oriented in line with the center of laser beam 218 (step 230). Once nail gun 216 is centered, indicator set 20 lights the center LED and a left LED (step 231). The left LED shows the tool operator to steer gun 216 to the left. Array 214 combines with detector 14 to determine when nail gun 216 is oriented to the left of laser beam 218 in a position for firing (step 232). Once nail gun 216 is in a firing position, component controller 16 enables the gun's firing mechanism, and indicator set 20 deasserts the left LED (step 233). After the nail is fired, component controller 16 disables the nail gun firing mechanism (step 234). The above-described process in FIG. 9 is performed repeatedly until all nails are driven into the work piece.

In another embodiment, a two-dimensional array of nailing patterns is preprogrammed into nail gun 216. This can be done at a factory where gun 216 is manufactured or a job site. Key pad 234 is mounted to nail gun 216 to facilitate data entry by the tool user. A user employs key pad 234 to enter a nailing pattern or select a preprogrammed nailing pattern.

In this embodiment, nail gun 216 operates with a guide system that provides for identifying a coordinate position. These guide systems include the guide wire system shown in FIG. 5 and the dual laser system shown in FIG. 4. Nail gun 216 operates as described above for tool 10 in FIGS. 4 and 5 to identify when gun 216 is oriented in line with a position where a nail is to be driven into a work piece. In gun 216, component controller 16 enables the gun's firing mechanism when location detector 14 indicates gun 216 is oriented in line with a desired nail target.

Those of ordinary skill in the art understand that as patterns for nailing can be established, the gun can also be programmed for "keep out" areas. On the keep out areas, the gun would not fire, even if the trigger were pulled. The keep out areas could be programmed by positioning the nail gun on the periphery of the keep out area and pushing a button on key pad 234—programming the position of the nailing gun as determined by guide detector 12 and location detector 14.

In other versions of nail gun 216, a memory in gun 216 records every position where a nail is fired into a work piece—making nail gun 216 self-auditing. The nailing pattern can be verified without the use of an inspector by downloading the nail pattern from the memory of nailing gun 216. Such self-auditing might be quite helpful in situations where precise nailing patterns are desirable. A related example is a similar application of placing rivets on an aircraft wing.

Figure 10:
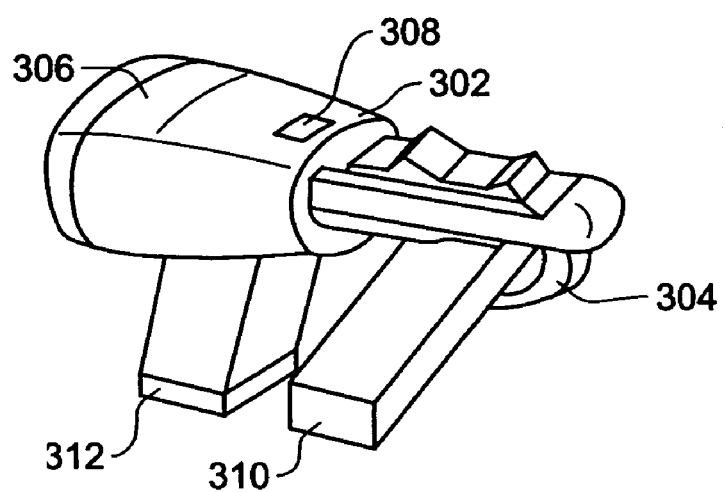
FIG. 10 illustrates a nail gun employing a track ball mechanism in accordance with the present invention.

FIG. 10 depicts an embodiment of the present invention with nail gun 302 employing rolling sensor 304 as a guide system. One example of rolling sensor 304 is track ball mechanism 100 shown in FIG. 6. Nail gun 302 includes the functionality and design described for tool 10 in FIG. 6, as well as key pad 306. Nail gun 302 allows a user to select a nail spacing pattern and only enables the gun's firing mechanism once rolling sensor 304 indicates the nailing gun is in the right position. Nail gun 302 determines its orientation by evaluating the guide signals from rolling sensor 304 using guide detector 12 and location detector 14, as described above with reference to FIG. 6. Location detector 14 then compares the detected orientation to the desired nail target. When nail gun 302 is in the desired position, indicator set 20 (FIG. 6) lights LED 308 to inform the user to pull the gun's trigger.

When nailing a piece of plywood or sheet rock with nail gun 302, a user can hold onto the trigger of gun 302, and slide gun 302 in a straight line. Nail gun 302 only fires in exact spacing increments, such as for example, every six inches. In another embodiment, a stud sensing system 310, which is known in the art, is added to nail gun 302. Nail gun 302 does not fire unless appropriately aligned with a stud underneath. In another implementation, nail gun 302 includes electrical voltage sensor 312 so that gun 302 does not fire if the nailing pattern interrupts an electric wire.

2. Jigsaw Embodiments

Figure 11:
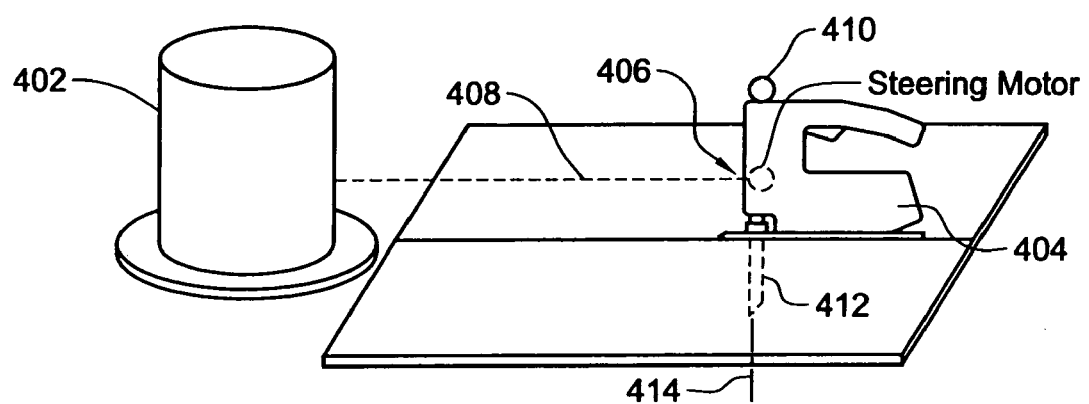
FIGS. 11 and 11A depict a jigsaw operating with a laser system in accordance with the present invention.
Figure 11A:
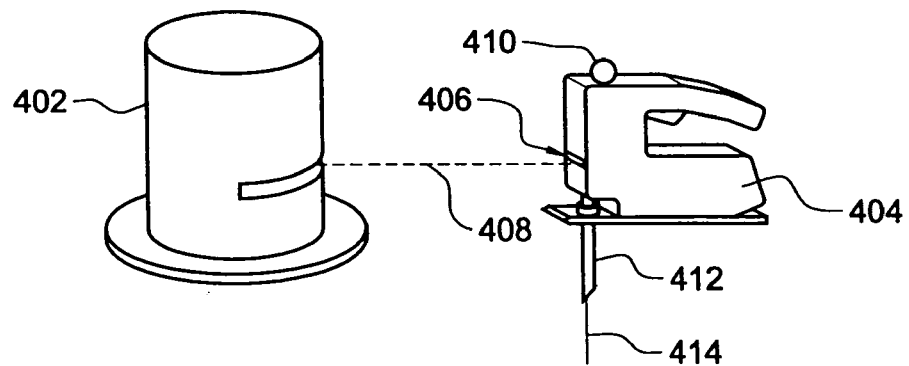

FIGS. 11 and 11A depict jigsaw 404 in use with laser system 402 to ensure that jigsaw 404 follows a cutting line defined by laser beam 408. Jigsaw 404 includes the functionality and design of tool 10 described in FIG. 3, and laser system 402 is the same as laser system 50 in FIG. 3. Jigsaw 404 employs photo diode detector array 406 to detect laser beam 408 in the same way guide detector 12 was described to operate in FIG. 3. Jigsaw 404 also includes location detector 14 to determine the orientation of jigsaw 404 and determine whether an orientation adjustment is necessary.

In one implementation, jigsaw 404 is a scroll type jigsaw with manual handle 410, which can direct the orientation of blade 412. Component controller 16 in saw 404 also controls the orientation of blade 412—driving a steering motor (not shown) attached to blade 412 to rotate blade 412 about its longitude axis 414. When jigsaw blade 412 starts to drift off the center line of laser beam 408, location detector 14 detects this occurrence and instructs component controller 16 to adjust the orientation of blade 412. Component controller 16 drives the steering motor to rotate blade 412—keeping blade 412 in line with laser beam 408.

3. Circular Saw Embodiments

Figure 12:
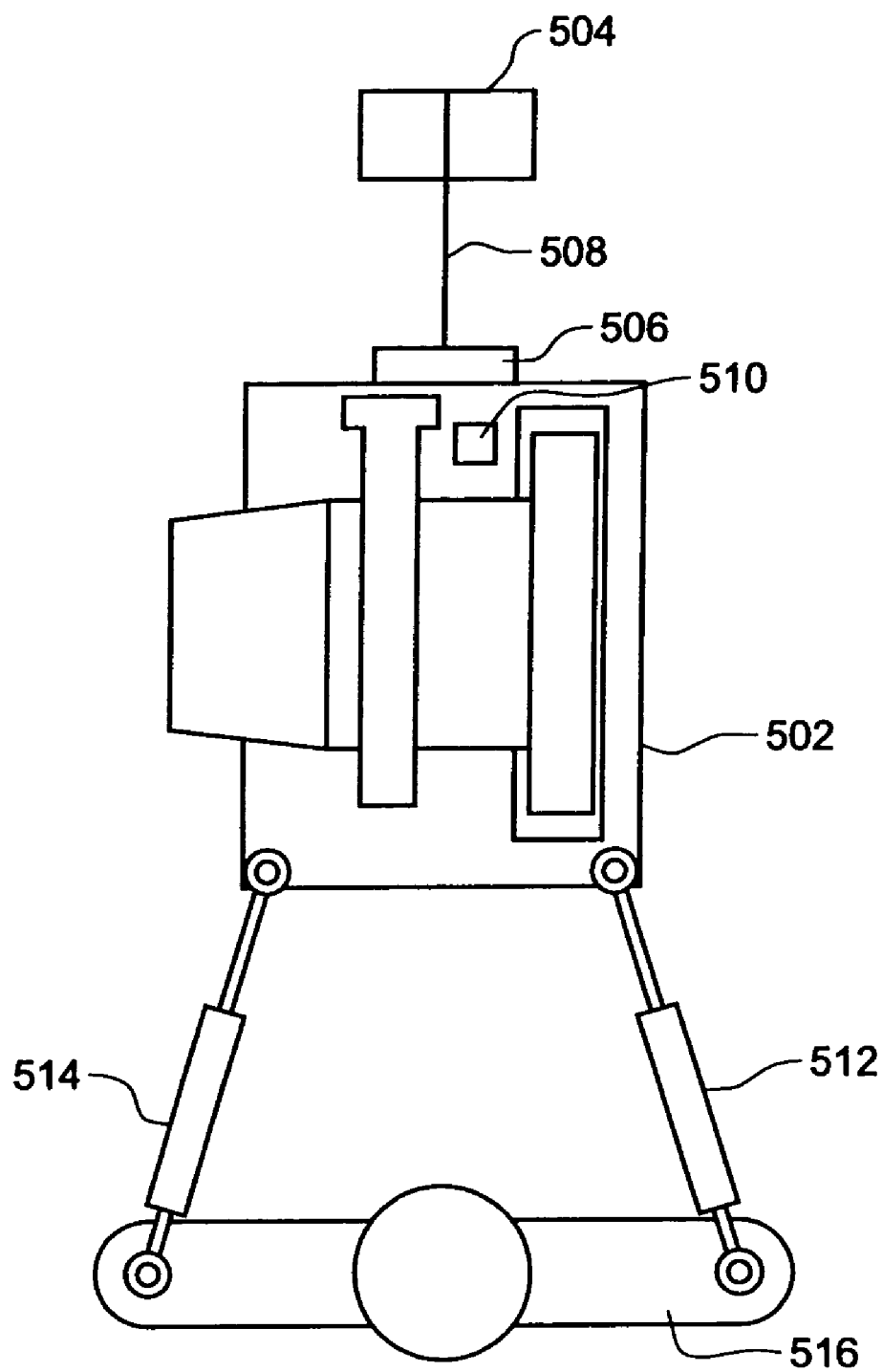
FIG. 12 illustrates a circular saw operating with a laser system in accordance with the present invention.

FIG. 12 shows circular saw 502 operating in conjunction with laser system 504 to ensure that saw 502 follows a predetermined cutting line defined by laser beam 508. Circular saw 502 and laser system 504 are the same as tool 10 and laser system 50 from FIG. 3. Circular saw 502 includes photo diode detector array 506 to serve as guide detector 12.

Photo diode detector array 304 is mounted on the front of a circular saw 502, such that the position of beam 508 relative to saw 502 is detected. Array 506 combines with location detector 14 to determine the orientation of saw 502 and whether any orientation corrections need to be made for the saw's blade to stay in line with laser beam 508.

In operation, a user provides a manual push to propel saw 502. When the orientation of saw 502 needs to be adjusted, location detector 14 signals component controller 16. In one implementation, component controller 16 drives motor steering mechanism 510 to change the orientation of the saw's blade to come in line with laser beam 508.

In an alternate embodiment, a blade velocity gauge (not shown) replaces motor steering mechanism 510 to implement angular velocity ripple. One half of the blade has teeth bent to the right, and the other half of the blade as teeth bent to the left. The velocity gauge responds to an orientation correction signal from component controller 16 by increasing the rotational speed of the blade for half a rotation. The increased speed steers the saw toward the direction of the teeth with enhanced speed.

In another implementation, alignment pistons 512 and 514 are employed in lieu of motor steering mechanism 510 and the above-described velocity gauge. Pistons 512 and 514 are positioned between circular saw 502 and handle 516, which a user employs to propel and steer saw 502. Component controller 16 issues signals to control alignment pistons 512 and 514—causing pistons 512 to 514 to adjust their lengths to bring the saw blade in line with laser beam 508. Examples of pistons 512 and 514 include pneumatic pistons and hydraulic pistons for a large saw arrangement. Alternatively, pistons 512 and 514 are mechanical pistons, extending or retracting in response to a rack and pinion arrangement driven by a motor.

4. Router Embodiments

Figure 13:
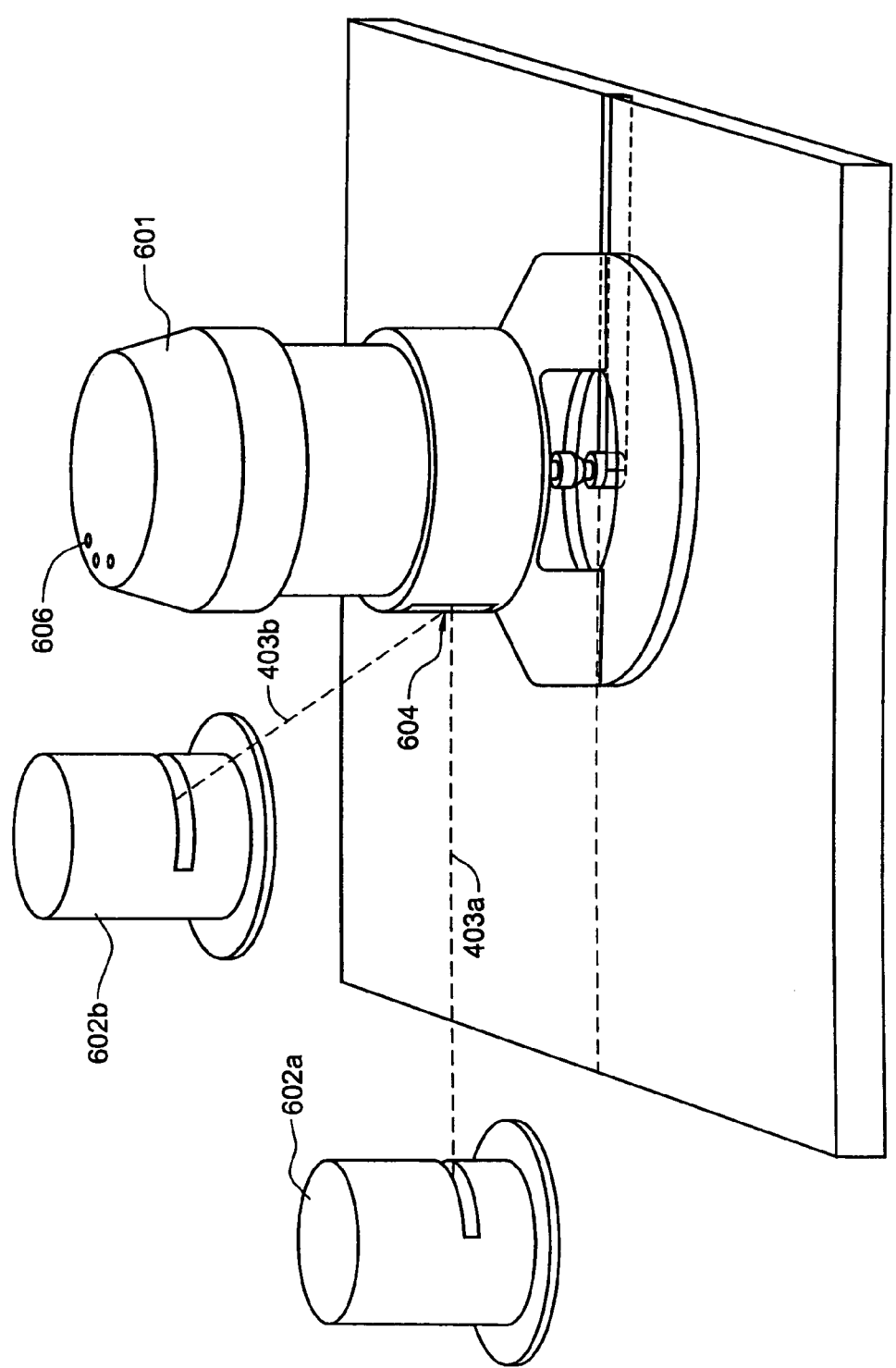
FIG. 13 depicts a router operating with a pair of laser systems in accordance with the present invention.

FIG. 13 shows router 601 in use with lasers 602a and 602b to ensure the proper orientation of the router's cutting head. Router 601 includes the functionality and design of tool 10 in FIG. 4, and laser systems 602a and 602b are the same as laser systems 60 and 62 in FIG. 4. Photo diode detector array 604 is mounted on router 601 to serve as guide detector 12. Array 604 combines with location detector 14 to receive laser beams 603a and 603b from lasers 602a and 602b and determine the orientation of router 601. As described with reference to FIG. 4, location detector 14 determines the orientation of router 601 in terms of an absolute position, such as a (x, y) coordinate. Based on the router's orientation, location detector 14 determines whether any tool adjustments are needed.

In one implementation, location detector 14 instructs component controller 16 to adjust the vertical displacement of the router's cutting head, based on the detected orientation. Component controller 16 directs the operation of a motor that moves the cutting head along a vertical axis. A memory in router 601 stores relief patterns, such as those used for carvings or cabinet face panel configurations. The vertical displacement of the cutting head is set to follow the desired depth of cut for each position in the relief pattern. This allows a user to simply move router 601 back and forth across a work piece, while router 601 automatically adjusts the height of the router cutting head. In a further embodiment, location detector 14 sends control signals to indicator set 20—showing a user the direction to steer router 601 for a selected relief pattern by illuminating lights 606.

In another embodiment, router 601 only employs a single laser system, such as laser system 602a. Router 601 uses array 604 and location controller 14 to control lights 606, so a user receives steering directions for keeping router 601 in line with laser beam 603a.

Figure 14:
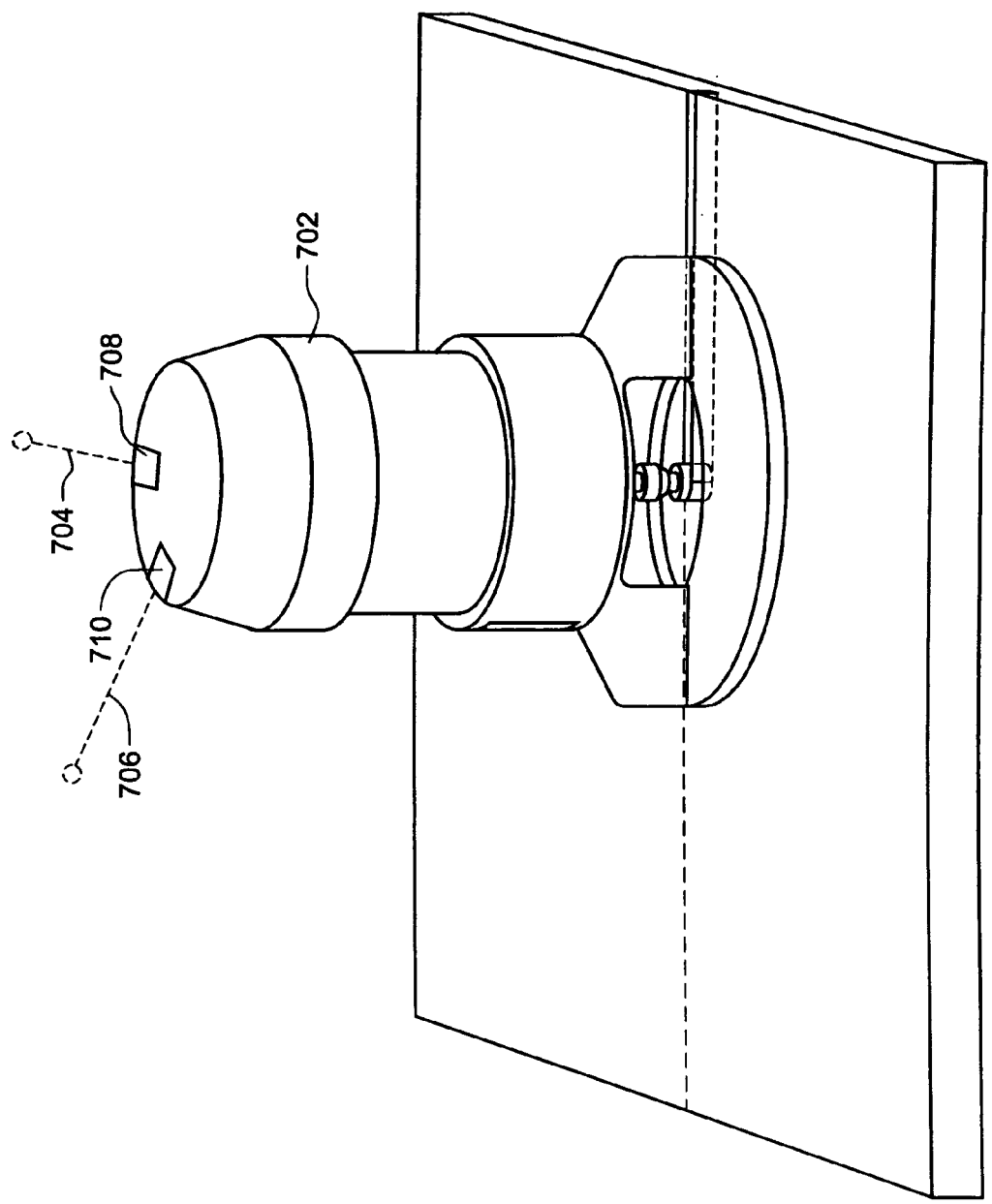
FIG. 14 shows a router operating with a pair of guide wires in accordance with the present invention.

FIG. 14 shows router 702 in use with guide wires 704 and 706 to achieve the same functionality as described above for router 601. Router 702 has the same functionality and design as router 10 in FIG. 5, and guide wires 704 and 706 operate the same as guide wires 84 and 86 in FIG. 5.

D. Tool Alignment, Depth Detection, and Leveling

Figure 15:
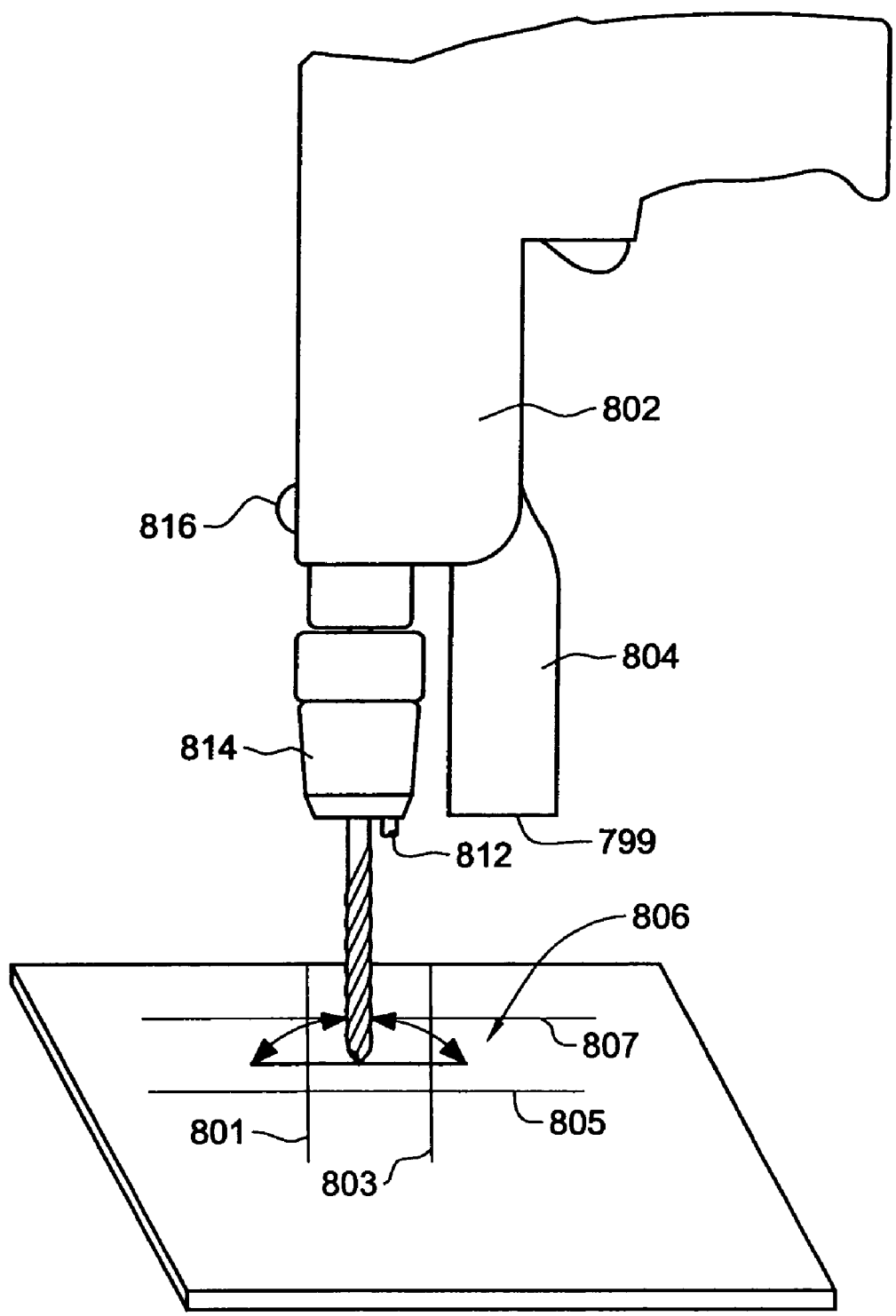
FIG. 15 shows a drill, including alignment and depth detectors in accordance with the present invention.

FIG. 15 shows tool 802 with depth detector 812 and alignment detector 804. In FIG. 15 tool 802 is shown as a drill. In alternate embodiments, however, tool 802 can be a variety of different tools, such as a nail gun. In one embodiment, tool 802 includes the functionality and design described for tool 10 in FIGS. 1–7. In alternate embodiments, tool 802 only includes a subset or none of the functionality described for tool 10 above.

Alignment detector 804 is attached to the head of the drill 804 and provides laser light grid 806. Grid 806 appears on a work piece as a set of perpendicular lines, resembling a tic-tac-toe grid, when face 799 of alignment detector 804 is parallel to the surface of the work piece. Alignment detector 804 is attached to drill 802 so the tic-tac-toe grid appears when the drill bit in drill 802 is normal to the surface of the work piece. Grid 806 includes parallel lines 805 and 807, which are perpendicular to parallel grid lines 801 and 803. A set of laser planes extending from alignment guide 804 form laser lines 801 and 803. Another set of laser planes extending from alignment guide 804 form laser lines 805 and 807.

When drill 802 is not normal to the work piece surface, lines 805 and 807 do not appear perpendicular to lines 801 and 803. When this occurs, the user adjusts the orientation of drill 802 until lines 801 and 803 are parallel to each other, lines 805 and 807 are parallel to each other, and lines 801 and 803 are perpendicular to lines 805 and 807. Those skilled in the art will recognize that patterns other than a tic-tac-toe grid can be employed in alternate embodiments.

Figure 15A:
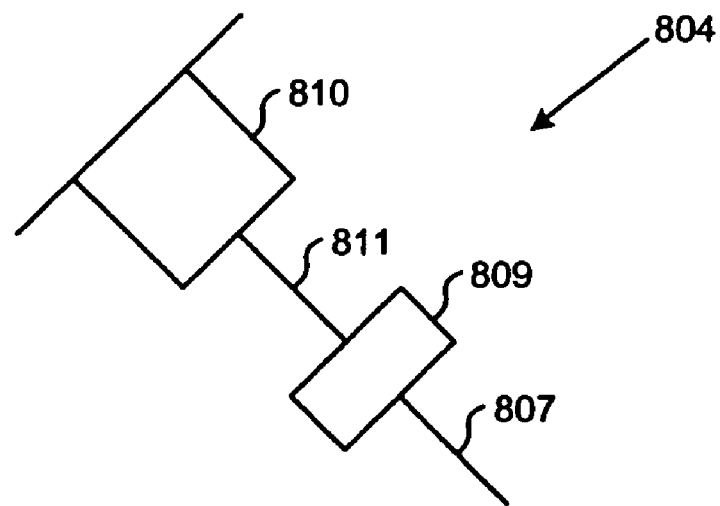
FIGS. 15A and 15B show one embodiment of an alignment detector.
Figure 15A:
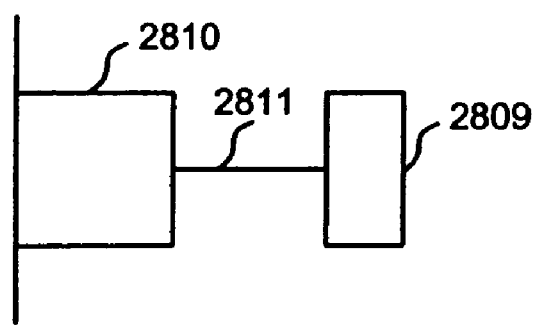
Figure 15A:
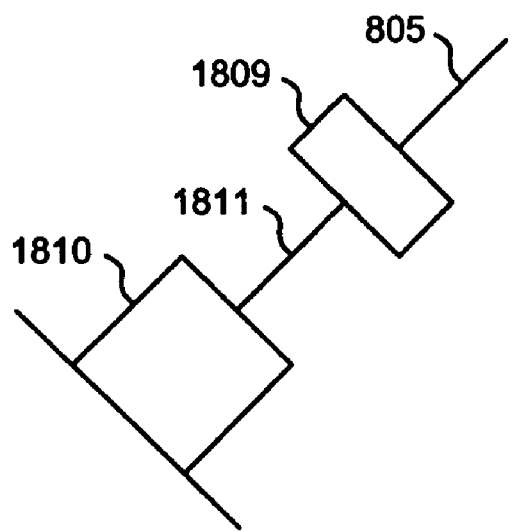
Figure 15B:
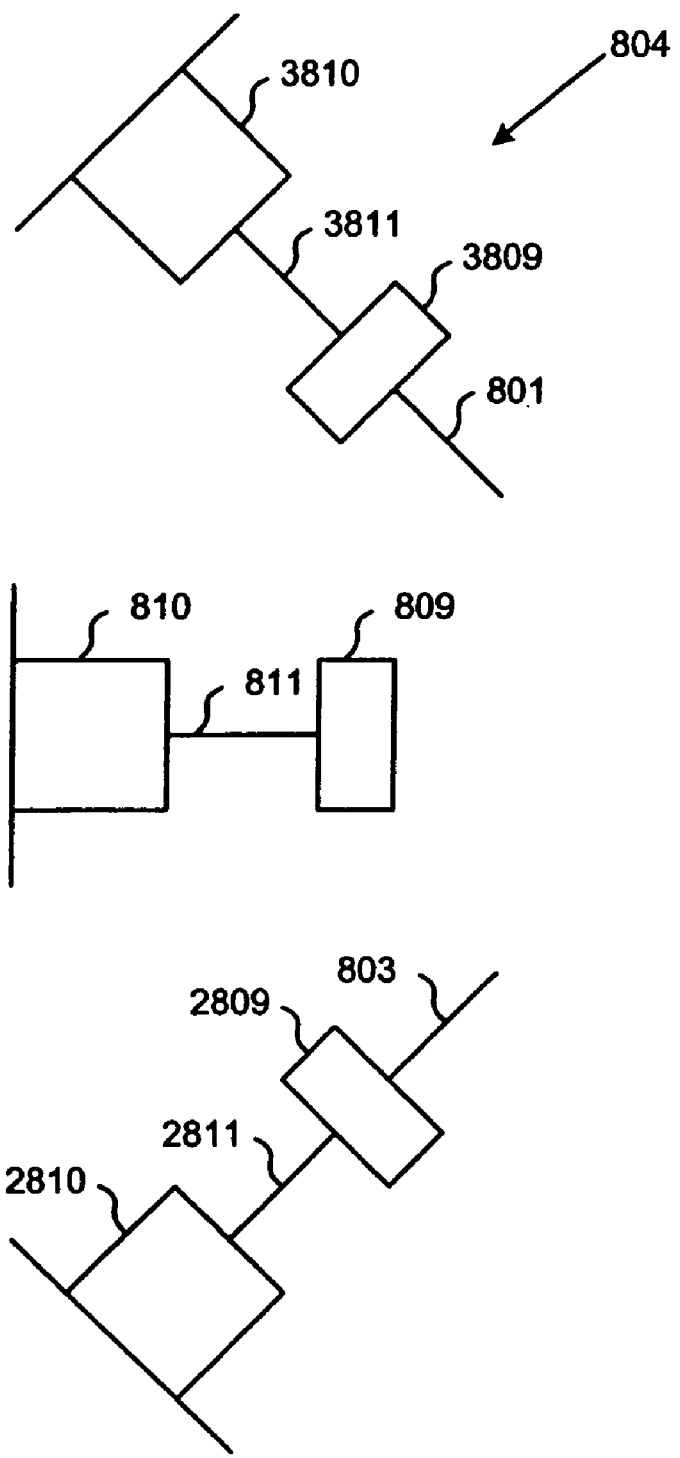

FIG. 15A shows a side view of hardware employed in alignment detector 804 to form grid 806. FIG. 15B shows a side view of the same hardware in FIG. 15A rotated by 90 degrees. Alignment detector 804 includes laser sources 810, 1810, 2810, and 3810 and optical elements 809, 1809, 2809, and 3809 mounted in a housing (not shown). In one embodiment, laser sources 810, 1810, 2810, and 3810 are laser diodes, and optical elements 809,1809, 2809, and 3809 are holographic elements. Those skilled in the art recognize that alternate components can be employed. For example, optical elements 809, 1809, 2809, and 3809 can be cylindrical lenses in alternate embodiments. Laser diodes 810, 1810, 2810, and 3810 deliver laser beams 811, 1811, 2811, and 3811 to holographic plates 809, 1809, 2809, and 3809, respectively. Laser beams 811, 1811, 2811, and 3811 are schematic representations of the actual laser beams from diodes 810, 1810, 2810, and 3810. Those skilled in the art understand that laser diodes 810, 1810, 2810, and 3810 each output a diverging laser beam that impacts a substantial portion or all of holographic plates 809, 1809, 2809, and 3809, respectively.

Holographic plates 809, 1809, 2809, and 3809 convert laser beams 811, 1811, 2811, and 3811 into a first laser plane set including converging laser planes 801 and 803, and a second laser plane set including converging laser planes 805 and 807. The planes from optical element 2809 is not shown in FIG. 15A, and the plane for optical element 809 is not shown in FIG. 15B. Planes 801, 803, 805, and 807 form laser lines 801, 803, 805, and 807, respectively, on the incident surface of a work piece. Alignment detector 804 can be aligned so that planes 801, 803, 805, and 807 are incident on a surface either before or after the location where the planes intersect.

Methods for designing and fabricating holographic plates, such as plates 809, 1809, 2809, and 3809, are well known in the art. In alternate embodiments, alignment detector 804 includes collimating lenses between lasers 810, 1810, 2810, and 3810 and holographic plates 809, 1809, 2809 and 3809, respectively.

In further embodiments, planes 801 and 803 originate from their respective optical elements as diverging planes. This is also true for planes 805 and 807. The term converging is used in this application to explain planes' initial orientation to each other at one point in space. As those skilled in the art recognize, converging planes, like those shown in FIGS. 15A and 15B, begin to diverge from each other after intersecting. In yet another embodiment, spinning lasers can be employed to create laser lines 801, 803, 805, and 807.

In other implementations, fewer than four laser sources are employed to generate laser beams 811, 1811, 2811, and 3811. For example, one laser source can be employed with multiple beam splitters, or other mechanisms for dividing a laser beam, to form beams 811, 1811, 2811, and 3811. Numerous combinations of laser sources and beam dividing mechanisms are possible.

Depth detector 812 (FIG. 15) determines the work piece depth reached by the bit on drill 802. Depth detector 812 is mounted to rotating chuck 814 of drill 802. Depth detector 812 determines when a preset depth has been reached and illuminates light 816 on drill 802 to inform the user that the appropriate depth had been obtained.

In one embodiment, depth detector 812 includes a sonar system similar to those employed in camera systems or a pin diode system. Alternatively, in conjunction with detector 812, a device is provided in drill 802 to measure the revolutions per minute of drill chuck 814. Computational means, such as a microprocessor, can then be provided to calculate the depth of the drilling action and the orientation of the drill bit relative to the work surface by knowing the angular speed and position of chuck 814.

Figure 16:
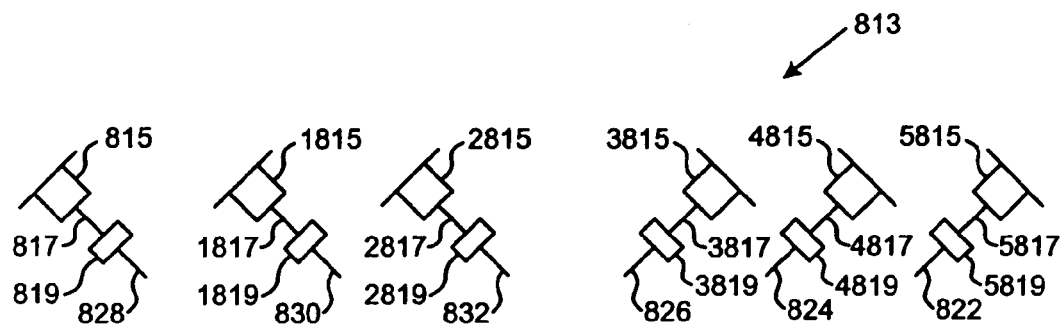
FIG. 16 shows one implementation of a depth detector.
Figure 16A:
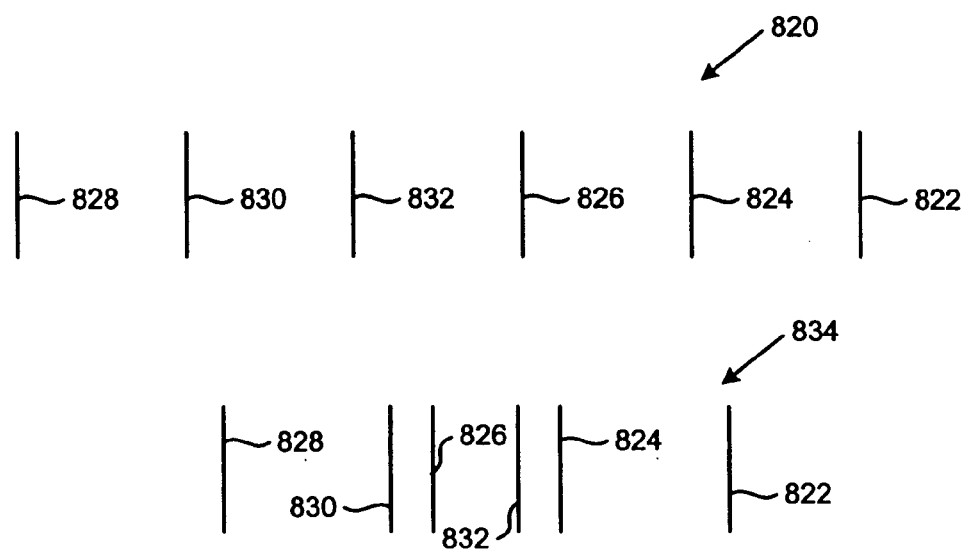
FIG. 16A illustrates a series of laser patterns provided by the depth detector in FIG. 16.
Figure 17:
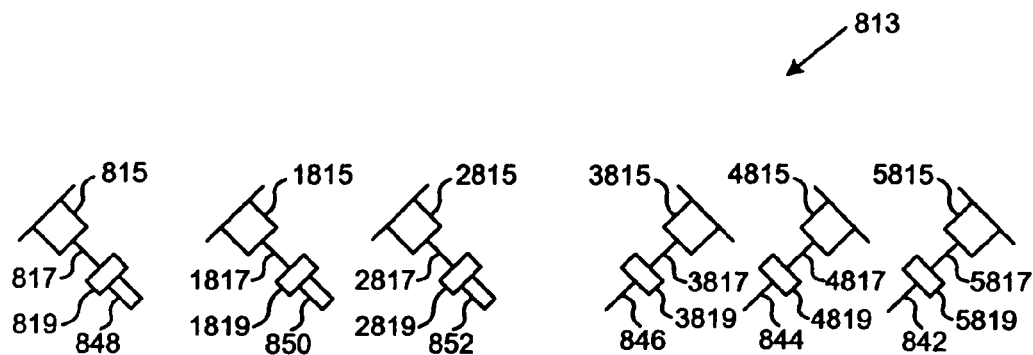
FIG. 17 shows an alternate implementation of a depth detector.
Figure 17A:
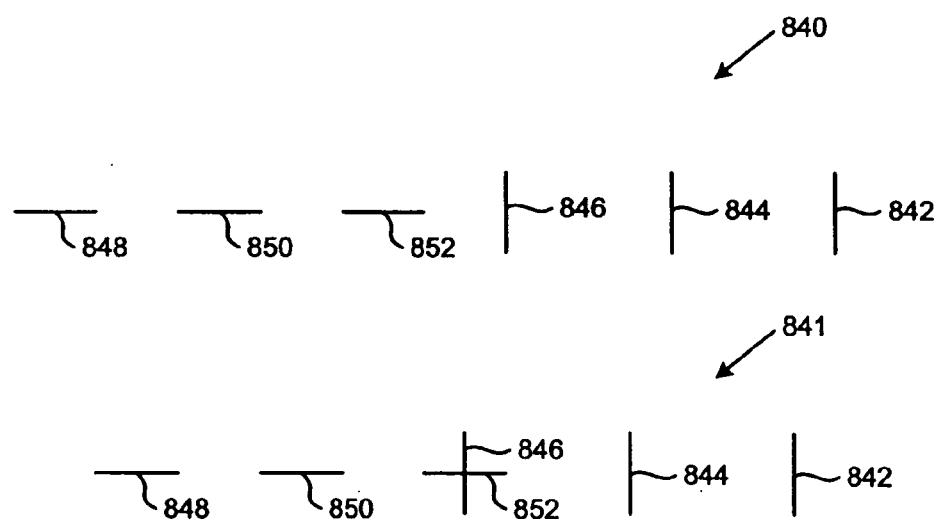
FIG. 17A illustrates a series of laser patterns provided by the depth detector in FIG. 17.

FIGS. 16 and 17 show an alternate embodiment of a depth detector 813 that can be attached to tool 802. The depth detector shown in FIGS. 16 and 17 is mounted to tool 802 on a stationary portion of the tool, like the way alignment detector 804 is attached to tool 802. Depth detector 813 generates laser patterns, as shown in FIGS. 16A and 17A, to indicate the depth of tool 802.

Depth detector 813 includes laser sources 815, 1815, 2815, 3815, 4815, and 5815 and optical elements 819, 1819, 2819, 3819, 4819, and 5819 mounted in a housing (not shown). In one embodiment, laser sources 815, 1815, 2815, 3815, 4815, and 5815 are laser diodes, and optical elements 819, 1819, 2819, 3819, 4819, and 5819 are holographic plates. Those skilled in the art recognize that other components can be employed for laser sources and optical elements, as explained above with regard to FIGS. 15, 15A, and 15B. Laser diodes 815, 1815, 2815, 3815, 4815, and 5815 supply laser beams 817, 1817, 2817, 3817, 4817, and 5817 to holographic plates 819, 1819, 2819, 3819, 4819, and 5819, which generate a set of laser planes. When the laser planes impact on a work piece surface they form patterns that correspond to the distance between depth detector 813 and the work piece. FIGS. 16A and 17A show example laser patterns. In further embodiments, depth detector 813 employs optical elements other than holographic plates, such as cylindrical lenses, to generate the patterns in FIGS. 16A and 17A. In other embodiments, depth detector 813 includes a collimating lens between the laser sources and optical elements.

Laser pattern 820 in FIG. 16A includes a first set of lines 828, 830 and 832 and a second set of lines 826, 824, and 822. Depth detector 813 generates pattern 820 by emitting two sets of converging laser planes. As shown in FIGS. 16 and 16A, the three planes in the first set are parallel to each other and form lines 828, 830, and 832 when they impact on a work piece. The three planes in the second set are parallel to each other and form lines 826, 824, and 822 when they impact on a work piece. Planes in the first set forming lines 828, 830, and 832 converge with the planes in the second set forming lines 826, 824, and 822.

As drill 802 is lowered into the work piece, the lines from the first set of laser planes and the lines from the second set of laser planes begin to move towards each other and eventually overlap, as shown in pattern 834. The tool operator determines the depth reached by tool 802, based on the laser line pattern produced by depth detector 812. In alternate embodiments, the appearance of lines 828, 830, and 832 are differentiated from the appearance of lines 826, 824, and 822. For example, one set of laser lines is generated as dashed lines.

In FIG. 17A, pattern 840 from depth detector 813 includes a set of horizontal lines 848, 850, and 852 and a set of vertical lines 842, 844, and 846. Each line in pattern 840 comes from a laser plane from depth detector 813 impacting a work piece surface. As shown in FIG. 17, depth detector 813 includes holographic plates 819, 1819, 2819, 3819, 4819, and 5819 to convert laser beams 817, 1817, 2817, 3817, 4817, and 5817, respectively, into the following: a first set of planes that form horizontal lines 848, 850, and 852 on a work piece and a second set of laser planes that form vertical lines 842, 844, and 846 on a work piece. The first set of planes is angled to converge with the second set of planes.

The resulting pattern on the work piece informs a tool operator of the depth reached by tool 802. Pattern 841 shows how the set of vertical lines overlaps with the set of horizontal lines as depth detector 813 moves closer to the work piece. In one embodiment, depth detector 813 is designed so a vertical line and horizontal line form a cross when tool 802 reaches a predefined depth. In further implementations, demarcations other than lines can be employed, such as crosses or stars.

Figure 18:
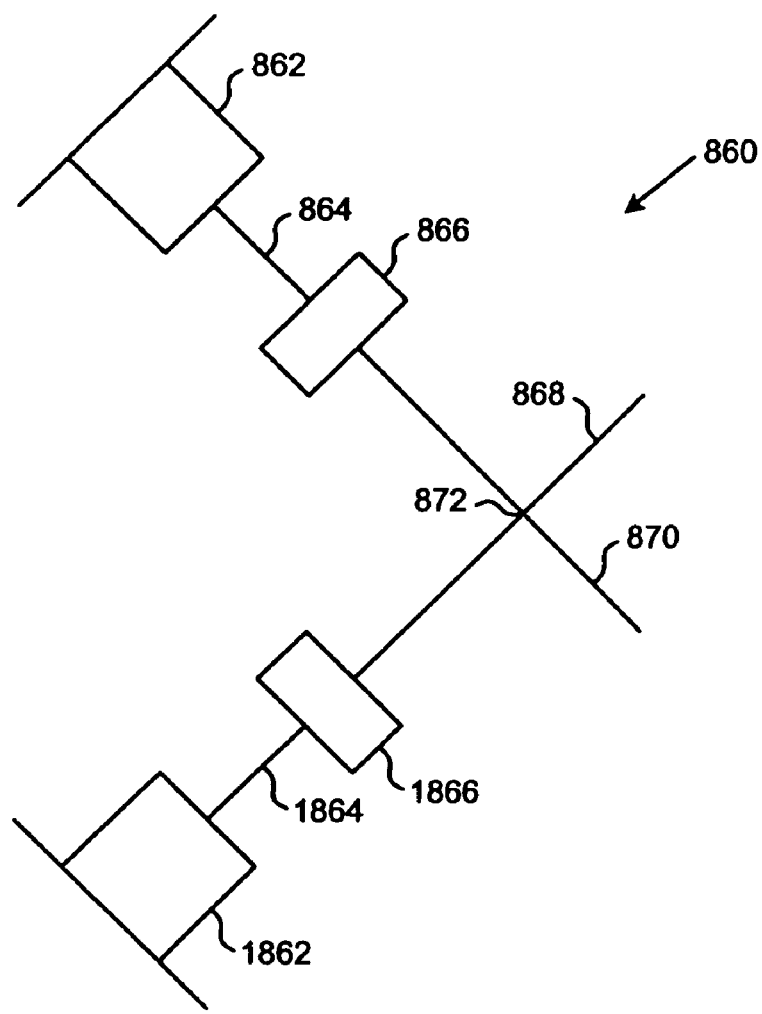
FIG. 18 shows one embodiment of a level detector.

FIG. 18 shows a level detector 860 employed on a tool in one embodiment of the present invention. In one implementation, level detector 860 is included on a tool with the functionality described above for tools 10 and 802. In other implementations, level detector 860 is included on a tool with a subset or none of the functionality described for tools 10 and 802. In some embodiments, level detector 860 is included in a leveling tool that only performs level detection operations.

Level detector 860 includes laser sources 862 and 1862 providing laser beams 864 and 1864 to optical elements 866 and 1866, respectively. The components of laser detector 860 are mounted in a housing (not shown). In one implementation, laser sources 862 and 1862 are laser diodes, and optical elements 866 and 1866 are holographic plates. Those skilled in the art recognize that other components can be employed, as described above with reference to FIGS. 15, 15A, and 15B. In alternate implementations, a collimating lens is inserted between holographic plates 866 and 1866 and laser diodes 862 and 1862, respectively. Holographic plates 866 and 1866 convert laser beams 864 and 1864 into converging laser planes 870 and 868, respectively. Planes 868 and 870 intersect along line 872.

Figure 18A:
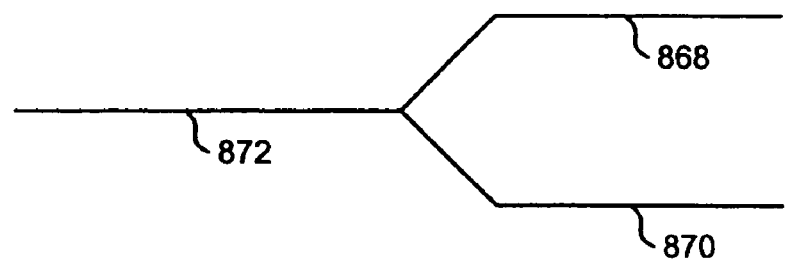
FIG. 18A shows laser patterns provided by the level detector in FIG. 18.

In operation, level detector 860 is suspended above the surface of a work piece, such as the top of a counter. In one implementation, level detector 860 is adjustably mounted on a tool, so its position with respect to a work surface can be modified. Level detector 860 is positioned so intersection line 872 is incident on the work piece surface. As shown in FIG. 18A, this creates single laser line 872 on the work piece surface—showing the tool user that the surface is level in the area where line 872 appears.

If the work piece surface is not level, two laser lines appear on the surface. In FIG. 18A, single laser line 872 diverges into laser line segments 868 and 870—indicating a surface area section that is not level with the area where line 872 appears. The diverging diagonal portions of laser line segments 868 and 870 indicate that the work piece surface is sloped. The parallel portions of laser line segments 868 and 870 indicate that the work piece surface is level, but offset from the area where line 872 exists.

Level detector 860 in FIG. 18 has broad applicability. In one instance, level detector 860 is mounted on a laser guide, as described above, to ensure that a rotating laser plane provided by the guide is perpendicular to a surface. In this application level detector 860 is mounted to the laser device so intersection line 872 appears on the target surface, or a parallel surface, when the laser plane is perpendicular.

In another embodiment, level detector 860 is employed when shimming a counter top. The counter is shimmed, until only intersection line 872 appears on the counter. If multiple lines 868 and 870 appear additional wedges are added under the counter surface. Leveling a counter top in multiple directions can be achieved by using multiple level detectors or a modified version of level detector 860. The modified version includes multiple level detectors, like the one shown in FIG. 18, to produce laser leveling signal's from multiple sides of the device.

Level detector 860 can also be used to determine whether a wall is plumb, by placing the detector at the wall's base or top. If only intersection line 872 appears, the wall in plumb. If multiple diverging laser lines appear, the wall is not plumb.

E. Tool Control System

Figure 19:
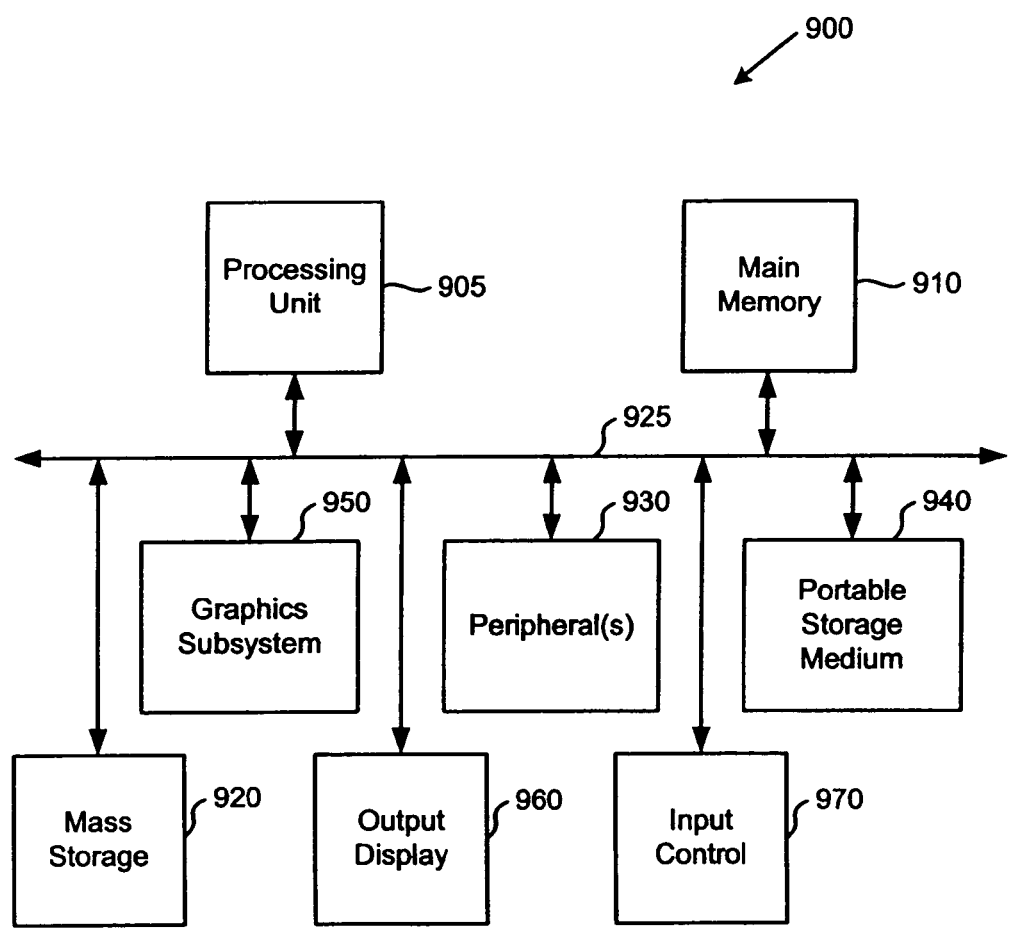
FIG. 19 illustrates hardware employed in a tool in one embodiment of the present invention to carry out sequences of operation described below with reference to FIGS. 1–14.

FIG. 19 illustrates a high level block diagram of general purpose computer system 900. System 900 may be employed in embodiments of the present invention to provide the functionality for guide detector 12, location detector 14, component controller 16, communications port 18, and indicator set 20. System 900 may be employed on tool 10 or remote from tool 10, but in either circumstance is considered to be part of tool 10. Accordingly, computer system 900 may be employed for performing a number of processes, including those described above with reference to FIGS. 1–14.

Computer system 900 contains processing unit 905, main memory 910, and interconnect bus 925. Processing unit 905 may contain a single microcontroller, single microprocessor, or a plurality of microcontrollers or microprocessors for configuring computer system 900 as a multi-processor system. Processing unit 905 is employed in conjunction with a memory or other data storage medium containing application specific program code instructions to implement the functionality of guide detector 12, location detector 14, and component controller 16.

Main memory 910 stores, in part, instructions and data for execution by processing unit 905. If a process, such as the processes described with reference to FIGS. 1–14, is wholly or partially implemented in software, main memory 910 can store the executable instructions for implementing the process when the computer is in operation. For example, main memory 910 can store program code instructions employed by guide detector 12, location detector 14, and component controller 16. In one implementation, main memory 910 includes banks of dynamic random access memory (DRAM) as well as high speed cache memory.

In one implementation, computer system 900 further include mass storage device 920, peripheral device(s) 930, portable storage medium drive(s) 940, input control device(s) 970, graphics subsystem 950, and output display 960. In alternate implementations, computer system 900 does not include all of the devices shown in FIG. 19.

For purposes of simplicity, all components in computer system 900 are shown in FIG. 19 as being connected via bus 925. However, computer system 900 may be connected through one or more data transport means in alternate implementations. For example, processing unit 905 and main memory 910 may be connected via a local microprocessor bus, and mass storage device 920, peripheral device(s) 930, portable storage medium drive(s) 940, and graphics subsystem 950 may be connected via one or more input/output busses.

Mass storage device 920 is a non-volatile storage device for storing data and instructions for use by processing unit 905. Mass storage device 920 can be implemented in a variety of ways, including a magnetic disk drive or an optical disk drive. In software embodiments of the present invention, mass storage device 920 stores the instructions executed by computer system 900 to perform processes such as those described with reference to FIGS. 1–14.

Portable storage medium drive 940 operates in conjunction with a portable non-volatile storage medium to input and output data and code to and from computer system 900. Examples of such storage mediums include floppy disks, compact disc read only memories (CD-ROM), memory sticks, and integrated circuit non-volatile memory adapters (i.e. PC-MCIA adapter). In one embodiment, the instructions for enabling computer system 900 to execute processes, such as those described with reference to FIGS. 1–14, are stored on such a portable medium, and are input to computer system 900 via portable storage medium drive 940.

Peripheral device(s) 930 may include any type of computer support device, such as an input/output interface, to add additional functionality to computer system 900. For example, peripheral device(s) 930 may include a communications controller, such as a network interface card or integrated circuit, for interfacing computer system 900 to a communications network or point-to-point links with other devices. Instructions for enabling computer system 900 to perform processes, such as those described with reference to FIGS. 1–14, may be downloaded into the computer system's main memory 910 over a communications network. Computer system 900 may also interface to a database management system over a communications network or other medium that is supported by peripheral device(s) 930.

Input control device(s) 970 provide a portion of the user interface for a user of computer system 900. Input control device(s) 970 may include an alphanumeric keypad for inputting alphanumeric and other key information, a cursor control device, such as a mouse, a track ball, stylus, or cursor direction keys. In order to display textual and graphical information, computer system 900 contains graphics subsystem 950 and output display 960. Output display 960 can include a cathode ray tube display or liquid crystal display.

Graphics subsystem 950 receives textual and graphical information, and processes the information for output to output display 960.

The components contained in computer system 900 are those typically found in general purpose computer systems. In fact, these components are intended to represent a broad category of such computer components that are well known in the art.

The process steps and other functions described above with respect to embodiments of the present invention may be implemented as software instructions. More particularly, the process steps described with reference to FIGS. 1–14 may be implemented as software instructions. For one software implementation, the software includes a plurality of computer executable instructions for implementation on a general purpose or application specific computer system. Prior to loading into a computer system, the software instructions may reside as encoded information on a computer readable medium, such as a magnetic floppy disk, magnetic tape, and compact disc read only memory (CD-ROM). In one hardware implementation, circuits may be developed to perform the process steps and other functions described herein.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A tool system adapted to operate on a work piece, said tool system comprising:
    a first guide system providing a first laser guide line; and
    a tool including:
        an action component adapted to operate on said work piece by following the laser guide line impinging on the tool,
        a guide detector adapted to detect a position of said first laser guide line incident on the guide detector and provide first guide position data corresponding to said position of said first guide, and
        a location detector in communication with said guide detector to receive said first guide position data, wherein said location detector is adapted to determine an orientation of said action component relative to said laser guide line, based at least in part on said first guide position data.

2. The tool system of claim 1, wherein said location detector is adapted to provide orientation information corresponding to said orientation of said action component.

3. The tool system of claim 2, wherein said tool further includes: a set of indicators in communication with said location detector to receive said orientation information, wherein a state of each indicator in said set is set in response to said orientation information.

4. The tool system of claim 3, wherein said first laser guide line extends across a portion of said work piece and said orientation information received from said location controller indicates whether said action component is oriented to be one of the following: in line with said first laser guide line, offset to a first side of said first laser guide line, or offset to a second side of said first laser guide line.

5. The tool system of claim 4, wherein said set of indicators includes:
    a first indicator adapted to be asserted when said orientation information indicates said action component is oriented to be in line with said first laser guide line,
    a second indicator adapted to be asserted when said orientation information indicates said action component is oriented to be offset to a first side of said first laser guide line, and
    a third indicator adapted to be asserted when said orientation information indicates said action component is oriented to be offset to a second side of said first laser guide line.

6. The tool system of claim 2, wherein said orientation information indicates whether a tool adjustment is needed.

7. The tool system of claim 6, further including:
    a component controller in communication with said location detector to receive said orientation information and in communication with said action component to adjust said action component in response to said orientation information.

8. The tool system of claim 7, wherein said first laser guide line extends across a portion of said work piece and said orientation information received from said location detector indicates whether said action component is oriented to be one of the following: in line with said first laser guide line, offset to a first side of said first laser guide line, or offset to a second side of said first laser guide line.

9. The tool system of claim 8, wherein said component controller is adapted to orient said action component to be in line with said first laser guide line in response to said orientation information.

10. The tool system of claim 9, wherein said component controller is adapted to orient said action component as follows:
    if said orientation information indicates said action component is oriented to be in line with said first laser guide line, said component controller maintains said orientation of said action component,
    if said orientation information indicates said action component is oriented to be offset to said first side of said first laser guide line, said component controller modifies said orientation of said action component to be in line with said first laser guide line, and
    if said orientation information indicates said action component is oriented to be offset to said second side of said first laser guide line, said component controller modifies said orientation of said action component to be in line with said first laser guide line.

11. The tool system of claim 10, wherein said tool is a jigsaw, said action component is a blade, and said component controller drives a motor coupled to said blade to orient said blade in response to said orientation information.

12. The tool system of claim 10, wherein said tool is a circular saw, said action component is a blade, and said component controller is in communication with a set of pistons to orient said blade in response to said orientation information.

13. The tool system of claim 6, further including:
    a component controller in communication with said location detector to receive said orientation information and in communication with said action component to set a state of said action component in response to said orientation information.

14. The tool system of claim 13, wherein said first laser guide line extends across said work piece and said orientation information received from said location detector indicates whether said action component is oriented to be one of the following: in line with said first laser guide line, offset to a first side of said first laser guide line, or offset to a second side of said first laser guide line.

15. The tool system of claim 14, wherein said tool is a nail gun, said action component is a nail firing mechanism, and said component controller is adapted to set said state of said action component as follows:
if said orientation information indicates said action component is oriented to be in line with said first laser guide line, said component controller disables said nail firing mechanism,
if said orientation information indicates said action component is oriented to be offset to said first side of said first laser guide line, said component controller enables said nail firing mechanism, and
if said orientation information indicates said action component is oriented to be offset to said second side of said first laser guide line, said component controller enables said nail firing mechanism.

16. The tool system of claim 1, further including:
a second laser guide line system providing a second laser guide line, wherein:
said guide detector is adapted to detect a position of said second laser guide line and provide second laser guide line position data corresponding to said position of said second laser guide line, and
said location detector is in communication with said guide detector to receive said second laser guide line position data, wherein said location detector is adapted to determine an orientation of said action component, based at least in part on said first laser guide position data and said second laser guide line position data.

17. The tool system of claim 16 wherein said location detector is adapted to provide orientation information corresponding to said orientation of said action component.

18. The tool system of claim 17, wherein said orientation information indicates whether an adjustment to said action component is needed.

19. The tool system of claim 18, further including:
a component controller in communication with said location detector to receive said orientation information and in communication with said action component to adjust said action component in response to said orientation information.

20. The tool system of claim 19, wherein said tool is a router, said action component is a cutting head, and said component controller is adapted to adjust a vertical displacement of said cutting head in response to said orientation information.

21. The tool system of claim 19, wherein said tool is a nail gun, said action component is a nail firing mechanism, and said component controller is adapted to adjust a state of said action component as follows:
if said orientation information indicates said action component is oriented in line with a location on said work piece where a nail is to be fired, said component controller enables said nail firing mechanism, and
if said orientation information indicates said action component is not oriented in line with a location on said work piece where a nail is to be fired, said component controller disables said nail firing mechanism.

22. A tool adapted to operate on a work piece, said tool comprising:
an action component adapted to said work piece relative to a laser guide line impinging on the tool,
a guide detector adapted to detect a position of at least a first laser guide line impinging upon the guide detector and provide first guide position data corresponding to said position of said first laser guide line; and
a location detector in communication with said guide detector to receive said first guide line position data, wherein said location detector is adapted to determine an orientation of said action component relative to said first laser guide line, based at least in part on said first laser guide position data.

23. The tool of claim 22, wherein said location detector is adapted to provide orientation information corresponding to said orientation of said action component.

24. The tool system of claim 23, wherein said tool further includes: a set of indicators in communication with said location detector to receive said orientation information, wherein a state of each indicator in said set is set in response to said orientation information.

25. The tool of claim 24, wherein said first laser guide line extends across a portion of said work piece and said orientation information received from said location controller indicates whether said action component is oriented to be one of the following: in line with said laser first guide line, offset to a first side of said first laser guide line, or offset to a second side of said laser first guide line.

26. The tool of claim 25, wherein said set of indicators includes:
a first indicator adapted to be asserted when said orientation information indicates said action component is oriented to be in line with said first laser guide line,
a second indicator adapted to be asserted when said orientation information indicates said action component is oriented to be offset to a first side of said first laser guide line, and
a third indicator adapted to be asserted when said orientation information indicates said action component is oriented to be offset to a second side of said first laser guide line.

27. The tool of claim 22, wherein said first laser guide line is a laser beam and said guide detector is a photo diode detector array.

28. The tool of claim 23, wherein said orientation information indicates whether a tool adjustment is needed.

29. The tool of claim 28, farther including:
a component controller in communication with said location detector to receive said orientation information and in communication with said action component to adjust said action component in response to said orientation information.

30. The tool of claim 29, wherein said first laser guide line extends across a portion of said work piece and said orientation information received from said location detector indicates whether said action component is oriented to be one of the following: in line with said first laser guide line, offset to a first side of said first laser guide line, or offset to a second side of said first laser guide line.

31. The tool of claim 30, wherein said component controller is adapted to orient said action component to be in line with said portion of said first laser guide line in response to said orientation information.

32. The tool of claim 31, wherein said component controller is adapted to orient said action component as follows:
if said orientation information indicates said action component is oriented to be in line with said first laser guide line, said component controller maintains said orientation of said action component, if said orientation information indicates said action component is oriented to be offset to said first side of said first laser guide line, said component controller modifies said orientation of said action component to be in line with said first laser guide line, and if said orientation information indicates said action component is oriented to be offset to said second side of said laser first guide line, said component controller modifies said orientation of said action component to be in line with said first laser guide line.

33. The tool of claim 32, wherein said tool is a jigsaw, said action component is a blade, and said component controller drives a motor coupled to said blade to orient said blade in response to said orientation information.

34. The tool of claim 32, wherein said tool is a circular saw, said action component is a blade, and said component controller is in communication with a set of pistons to orient said blade in response to said orientation information.

35. The tool of claim 29, wherein said tool is a nail gun, said action component is a nail firing mechanism, and said component controller is adapted to adjust said action component as follows:

if said orientation information indicates said action component is oriented to be in line with said first laser guide line, said component controller disables said nail firing mechanism, if said orientation information indicates said action component is oriented to be offset to said first side of said first laser guide line, said component controller enables said nail firing mechanism, and if said orientation information indicates said action component is oriented to be offset to said second side of said first laser guide line, said component controller enables said nail firing mechanism.

36. The tool of claim 22, wherein said guide detector is farther adapted to detect a position of a second laser guide line and provide second laser guide line position data corresponding to said position of said second laser guide line, wherein said location detector is in communication with said guide detector to receive said second laser guide line position data, wherein said location detector is adapted to determine an orientation of said action component, based at least in part on said first laser guide line position data and said second guide line position data.

37. The tool of claim 36 wherein said location detector is adapted to provide orientation information corresponding to said orientation of said action component.

38. The tool of claim 37, wherein said orientation information indicates whether an adjustment to said action component is needed.

39. The tool of claim 38, farther including:

a component controller in communication with said location detector to receive said orientation information and in communication with said action component to adjust said action component in response to said orientation information.

40. The tool of claim 39, wherein said tool is a router, said action component is a cutting head, and said component controller is adapted to adjust a vertical displacement of said cutting head in response to said orientation information.

41. The tool of claim 39, wherein said tool is a nail gun, said action component is a nail firing mechanism, and said component controller is adapted to adjust said action component as follows:

if said orientation information indicates said action component is oriented in line with a location on said work piece where a nail is to be fired, said component controller enables said nail firing mechanism, and if said orientation information indicates said action component is not oriented in line with a location on said work piece where a nail is to be fired, said component controller disables said nail firing mechanism.

42. A tool adapted to operate on a work piece, said tool comprising:

an action component adapted to operate on said work piece along a laser line a location detector adapted to determine an orientation of said action component relative to the laser line, based at least in part on a position of a set of one or more laser guide lines impinging upon the action component, and provide orientation information corresponding to said orientation; and a component controller in communication with said location detector to receive said orientation information and in communication with said action component to adjust said action component in response to said orientation information.

43. The tool of claim 42, wherein said tool further includes:

a set of indicators in communication with said location detector to receive said orientation information, wherein a state of each indicator in said set is set in response to said orientation information.

44. The tool of claim 42, wherein said orientation information indicates whether an action component adjustment is needed.

45. The tool of claim 44, wherein said component controller is in communication with said action component to orient said action component in response to said orientation information.

46. The tool of claim 44, wherein said component controller is in communication with said action component to change a state of said action component in response to said orientation information.

47. The tool of claim 44, wherein said tool is a jigsaw, said action component is a blade, and said component controller drives a motor coupled to said blade to orient said blade in response to said orientation information.

48. The tool of claim 44, wherein said tool is a circular saw, said action component is a blade, and said component controller orients said blade in response to said orientation information.

49. The tool of claim 48, wherein said component controller is in communication with a set of pistons to orient said blade in response to said orientation information.

50. The tool of claim 44, wherein said tool is a router and said action component is a cutting head.

51. The tool of claim 50, wherein said component controller is adapted to adjust a vertical displacement of said cutting head in response to said orientation information.

52. The tool of claim 44, wherein said tool is a nail gun and said action component is a nail firing mechanism.

53. The tool of claim 52, wherein said component controller is adapted to set a state of said nail firing mechanism as follows:

if said orientation information indicates said nail firing mechanism is oriented in line with a location on said work piece where a nail is to be fired, said component controller enables said nail firing mechanism, and if said orientation information indicates said nail firing mechanism is not oriented in line with a location on said work piece where a nail is to be fired, said component controller disables said nail firing mechanism.

54. A method for identifying the orientation of a tool on a work piece, wherein said tool includes an action component for operating on said work piece along a line, said method including the steps of:
 (a) detecting position data for one or more laser guide lines incident upon said action component;
 (b) determining an orientation of said tool relative to said laser line based at least in part on said position data detected in said step (a); and
 (c) adjusting said tool in response to said orientation determined in said step (b).

55. The method of claim 54, wherein said step (c) includes the step of:
 (1) asserting at least one indicator.

56. The method of claim 55, wherein said at least one indicator identifies a direction for steering said tool.

57. The method of claim 54, wherein said step (c) includes the step of:
 (1) adjusting an orientation of said component.

58. The method of claim 54, wherein said step (c) includes the step of:
 (1) adjusting a state of said component.

59. A tool adapted to operate on a work piece, said tool comprising:
 an action component adapted to operate on said work piece along a line;
 one or more storage devices; and
 one or more processing devices in communication with said one or more storage devices and said action component, said one or more processing devices including code instructing the devices to perform a method comprising the steps of:
 (a) determining an orientation of said tool based at least in part on a position of a set of one or more laser guide lines impinging upon said tool; and
 (b) adjusting said tool in response to said orientation determined in said step (a).

60. The tool of claim 59, wherein said step (b) includes the step of:
 (1) asserting at least one indicator.

61. The tool of claim 59, wherein said step (b) includes the step of:
 (1) adjusting an orientation of said component.

62. The tool of claim 59, wherein said step (b) includes the step of:
 (1) adjusting a state of said component.

63. The tool of claim 59, wherein said tool is a jigsaw and said action component is a blade, wherein said step (b) includes the step of:
 (1) adjusting an orientation of said blade.

64. The tool of claim 59, wherein said tool is a circular saw and said action component is a blade, wherein said step (b) includes the step of:
 (1) adjusting an orientation of said blade.

65. The tool of claim 59, wherein said tool is a router and said action component is a cutting head, wherein said step (b) includes the step of:
 (1) adjust a vertical displacement of said cutting head.

66. The tool of claim 59, wherein said tool is a nail gun and said action component is a nail firing mechanism, wherein said step (b) includes the steps of:
 (1) enabling said nail firing mechanism if said orientation corresponds to said nail firing mechanism being in line with a location on said work piece where a nail is to be fired; and
 (2) disabling said nail firing mechanism if said orientation corresponds to said nail firing mechanism not being in line with a location on said work piece where a nail is to be fired.

67. A tool adapted to operate on a work piece along a line, said tool comprising:
 means for detecting position data for one or more laser guide lines incident upon the tool;
 means for determining an orientation of said tool based at least in part on said position data; and
 means for adjusting said tool relative to said laser guide lines in response to said orientation determined by said means for determining.

68. The tool of claim 67, wherein said tool includes:
 a set of one or more indicators; and
 means for asserting at least one indicator in said set of one or more indicators in response to said orientation of said tool.

69. The tool of claim 67, wherein said means for adjusting includes:
 means for adjusting an orientation of said tool in response to said orientation determined by said means for determining.

70. The tool of claim 67, wherein said means for adjusting includes: means for adjusting a state of said tool in response to said orientation determined by said means for determining.

* * * * *

UNITED STATES PATENT AND TRADEMARK OFFICE
CERTIFICATE OF CORRECTION

PATENT NO.       : 7,170,076 B2                                    Page 1 of 1
APPLICATION NO.  : 10/081865
DATED            : January 30, 2007
INVENTOR(S)      : Butler et al.

It is certified that error appears in the above-identified patent and that said Letters Patent is hereby corrected as shown below:

Col. 19, line 66: after "to" and before "said" insert --operate on--

Claim 36
Col. 21, line 36: delete "farther" and replace with --further--

Claim 39
Col. 21, line 54: delete "farther" and replace with --further--

Signed and Sealed this

Eighth Day of May, 2007

JON W. DUDAS
*Director of the United States Patent and Trademark Office*